United States Patent
Kaneoya et al.

(10) Patent No.: US 9,587,175 B2
(45) Date of Patent: *Mar. 7, 2017

(54) NEMATIC LIQUID CRYSTAL COMPOSITION

(71) Applicant: DIC CORPORATION, Tokyo (JP)

(72) Inventors: Masakazu Kaneoya, Kita-adachi-gun (JP); Kiyofumi Takeuchi, Kita-adachi-gun (JP); Masashi Osawa, Kita-adachi-gun (JP); Kenta Tojo, Kita-adachi-gun (JP); Tetsuo Kusumoto, Kita-adachi-gun (JP)

(73) Assignee: DIC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/421,015

(22) PCT Filed: Jul. 24, 2013

(86) PCT No.: PCT/JP2013/070058
§ 371 (c)(1),
(2) Date: Feb. 11, 2015

(87) PCT Pub. No.: WO2014/030482
PCT Pub. Date: Feb. 27, 2014

(65) Prior Publication Data
US 2015/0203757 A1    Jul. 23, 2015

(30) Foreign Application Priority Data

Aug. 22, 2012  (JP) ................. 2012-183221

(51) Int. Cl.
| | | |
|---|---|---|
| C09K 19/56 | (2006.01) | |
| C09K 19/30 | (2006.01) | |
| C09K 19/20 | (2006.01) | |
| C09K 19/32 | (2006.01) | |
| C09K 19/44 | (2006.01) | |
| C09K 19/54 | (2006.01) | |
| C09K 19/04 | (2006.01) | |
| C09K 19/12 | (2006.01) | |
| C09K 19/34 | (2006.01) | |
| G02F 1/00 | (2006.01) | |

(52) U.S. Cl.
CPC .......... *C09K 19/3066* (2013.01); *C09K 19/20* (2013.01); *C09K 19/322* (2013.01); *C09K 19/44* (2013.01); *C09K 19/542* (2013.01); *C09K 2019/0448* (2013.01); *C09K 2019/0466* (2013.01); *C09K 2019/122* (2013.01); *C09K 2019/123* (2013.01); *C09K 2019/124* (2013.01); *C09K 2019/301* (2013.01); *C09K 2019/3004* (2013.01); *C09K 2019/3012* (2013.01); *C09K 2019/3019* (2013.01); *C09K 2019/3025* (2013.01); *C09K 2019/3422* (2013.01); *C09K 2019/548* (2013.01); *G02F 1/0045* (2013.01)

(58) Field of Classification Search
CPC .................................. C09K 19/3066
USPC ..................................... 252/299.63
See application file for complete search history.

(56) References Cited

U.S. PATENT DOCUMENTS

| | | |
|---|---|---|
| 5,730,904 A | 3/1998 | Bartmann et al. |
| 5,733,477 A | 3/1998 | Kondo et al. |
| 5,800,734 A | 9/1998 | Buchecker et al. |
| 6,207,076 B1 | 3/2001 | Koga et al. |
| 6,210,603 B1 | 4/2001 | Kondo et al. |
| 6,254,941 B1 | 7/2001 | Kondou et al. |
| 7,198,827 B1 | 4/2007 | Takeuchi et al. |
| 8,916,718 B2 | 12/2014 | Tojo et al. |
| 9,039,929 B2 | 5/2015 | Kaneoya et al. |
| 2002/0166994 A1 | 11/2002 | Kondo et al. |
| 2003/0197153 A1 | 10/2003 | Heckmeier et al. |
| 2005/0012073 A1 | 1/2005 | Goulding et al. |
| 2006/0061699 A1 | 3/2006 | Kirsch et al. |
| 2006/0263542 A1 | 11/2006 | Kirsch et al. |

(Continued)

FOREIGN PATENT DOCUMENTS

| | | |
|---|---|---|
| CN | 1184462 A | 6/1998 |
| DE | 44 16 256 A1 | 11/1994 |
| DE | 10 2009 009 631 A1 | 9/2009 |
| DE | 102010015824 A1 | 3/2011 |
| DE | 112013004132 T5 | 5/2015 |
| EP | 0 882 696 A1 | 12/1998 |
| JP | 8-283183 A | 10/1996 |
| JP | 9-157202 A | 6/1997 |
| JP | 2001011458 A | 1/2001 |
| JP | 2003-183656 A | 7/2003 |
| JP | 2007-23071 A | 2/2007 |
| JP | 2007-177241 A | 7/2007 |

(Continued)

OTHER PUBLICATIONS

International Search Report dated Sep. 17, 2013 issued in corresponding application No. PCT/JP2013/070058.

(Continued)

*Primary Examiner* — Chanceity Robinson
(74) *Attorney, Agent, or Firm* — Westerman, Hattori, Daniels & Adrian, LLP

(57) ABSTRACT

The present invention relates to a nematic liquid crystal composition useful as an electro-optic liquid crystal display material and having a positive dielectric anisotropy ($\Delta\epsilon$). The liquid crystal composition has refractive index anisotropy ($\Delta n$) adjusted to a desired level, a sufficiently low viscosity ($\eta$), and a positive dielectric anisotropy ($\Delta\epsilon$) while degradation of the temperature range of the nematic phase is avoided by suppressing the decrease in nematic phase-isotropic liquid phase transition temperature ($T_{ni}$) and the increase in lower limit temperature of the nematic phase. The liquid crystal composition contains one or more compounds selected from compounds represented by general formula (LC0) and one or more compounds selected from a group of compounds represented by general formula (LC1) to general formula (LC5).

22 Claims, No Drawings

(56) References Cited

U.S. PATENT DOCUMENTS

| | | |
|---|---|---|
| 2007/0134444 A1 | 6/2007 | Harding et al. |
| 2007/0205396 A1 | 9/2007 | Czanta et al. |
| 2009/0103011 A1 | 4/2009 | Bernatz et al. |
| 2009/0230355 A1 | 9/2009 | Czanta et al. |
| 2009/0302273 A1* | 12/2009 | Tanaka .................. C07C 43/225 252/299.61 |
| 2010/0294991 A1 | 11/2010 | Saito et al. |
| 2011/0001090 A1 | 1/2011 | Wittek et al. |
| 2011/0037912 A1 | 2/2011 | Saito et al. |
| 2011/0233466 A1 | 9/2011 | Jansen et al. |
| 2011/0253934 A1 | 10/2011 | Lietzau et al. |
| 2011/0291048 A1 | 12/2011 | Hamano et al. |
| 2011/0315925 A1 | 12/2011 | Hiraoka et al. |
| 2013/0300996 A1 | 11/2013 | Takeuchi et al. |
| 2013/0306908 A1 | 11/2013 | Jansen et al. |
| 2014/0225036 A1 | 8/2014 | Kaneoya et al. |
| 2014/0275577 A1* | 9/2014 | Tojo et al. .................... 549/427 |
| 2015/0184076 A1 | 7/2015 | Kaneoya et al. |
| 2015/0203757 A1 | 7/2015 | Kaneoya et al. |
| 2015/0218451 A1 | 8/2015 | Kaneoya et al. |
| 2015/0322343 A1 | 11/2015 | Kaneoya et al. |

FOREIGN PATENT DOCUMENTS

| | | |
|---|---|---|
| JP | 2007-277127 A | 10/2007 |
| JP | 2009-215556 A | 9/2009 |
| JP | 2011-37998 A | 2/2011 |
| JP | 2011-148761 A | 8/2011 |
| JP | 2011-195587 A | 10/2011 |
| JP | 5263461 B2 | 8/2013 |
| KR | 10-2006-0119879 A | 11/2006 |
| WO | 96/32365 A1 | 10/1996 |
| WO | 98/23564 A1 | 6/1998 |
| WO | 2009/150963 A1 | 12/2009 |
| WO | 2012/043387 A1 | 4/2012 |
| WO | 2012100809 A1 | 8/2012 |
| WO | WO 2012161178 A1 * | 11/2012 |
| WO | 2013/018796 A1 | 2/2013 |
| WO | 2014/030481 A1 | 2/2014 |

OTHER PUBLICATIONS

Written Opinion of the International Searching Authority dated Sep. 17, 2013 issued in corresponding application No. PCT/JP2013/070058.

International Search Report dated Sep. 17, 2013, issued in application No. PCT/JP2013/070057, counterpart to U.S. Appl. No. 14/419,308 (5 pages).

Written Opinion of the International Searching Authority dated Sep. 17, 2013, issued in application No. PCT/JP2013/070057, counterpart to U.S. Appl. No. 14/419,308 (7 pages).

German Office Action dated Nov. 26, 2015, issued in German Patent Application No. 11 2013 005 035.8, with English translation (10pages), counterpart of U.S. Appl. No. 14/436,213.

German Office Action dated Nov. 27, 2015, issued in German Patent Application No. 11 2013 005 036.6, with English translation (10 pages), counterpart to U.S. Appl. No. 14/436,181.

Decision to Grant a Patent dated Apr. 1, 2014, issued in Japanese Application No. 2013-553697, wlEnglish translation (3 pages), counterpart of U.S. Appl. No. 14/436,213.

International Search Report dated Oct. 22, 2013, issued in International Application No. PCT/JP2013/073968, counterpart of U.S. Appl. No. 14/436,213.

Office Action dated Jan. 21, 2014, issued in Japanese Application No. 2013-553696, w/English translation (4 pages), counterpart to U.S. Appl. No. 14/436,181.

Decision to Grant a Patent dated Apr. 1, 2014, issued in Japanese Application No. 2013-553696, w/English translation (3 pages), counterpart to U.S. Appl. No. 14/436,181.

International Search Report dated Oct. 23, 2013, issued in International Application No. PCT/JP2013/073967 (2 pages), counterpart to U.S. Appl. No. 14/436,181.

Notification of Reasons for Refusal dated Jan. 21, 2014, issued in Japanese Application No. 2013-553697, with English translation (4 pages), counterpart of U.S. Appl. No. 14/436,213.

International Search Report dated Sep. 17, 2013, issued in application No. PCT/JP2013/070057, counterpart to U.S. Appl. No. 14/419,308.

Written Opinion of the International Searching Authority dated Sep. 17, 2013, issued in application No. PCT/JP2013/070057, counterpart to U.S. Appl. No. 14/419,308.

German Office Action dated Nov. 26, 2015, issued in German Patent Application No. 11 2013 005 035.8, with English translation (10 pages), counterpart of U.S. Appl. No. 14/436,213.

German Office Action dated Nov. 27, 2015, issued in German Patent Application No. 11 2013 005 036.6, with English translation (10 pages), counterpart of U.S. Appl. No. 14/436,181.

International Search Report of PC/JP2012/069461, dated Sep. 18, 2012, corresponding to U.S. Appl. No. 14/236,547.

Decision to Grant a Patent dated Apr. 1, 2014, issued in Japanese Application No. 2013/553697, w/English translation (3 pages), counterpart of U.S. Appl. No. 14/436,213.

International Search Report dated Oct. 22, 2013, issued in International Application No. PCT/JP2013/073968 (2 pages), counterpart of U.S. Appl. No. 14/436,213.

* cited by examiner

NEMATIC LIQUID CRYSTAL COMPOSITION

TECHNICAL FIELD

The present invention relates to a nematic liquid crystal composition useful as an electro-optic liquid crystal display material and having positive dielectric anisotropy ($\Delta\varepsilon$).

BACKGROUND ART

Liquid crystal display devices are being used in watches, calculators, various measurement instruments, automobile panels, word processors, electronic organizers, printers, computers, televisions, clocks, advertising boards, etc. Typical examples of the liquid crystal display mode include TN (twisted nematic) mode, STN (super twisted nematic) mode, a VA mode featuring vertical alignment using TFTs (thin film transistors), and an IPS (in-plane switching) mode/FFS mode featuring horizontal alignment. Liquid crystal compositions used in these liquid crystal display devices are required to be stable against external factors such as moisture, air, heat, and light, stay in a liquid crystal phase in a temperature range as wide as possible centered around room temperature, exhibit low viscosity, and operate at a low drive voltage. A liquid crystal composition is composed of several to dozens of compounds in order to optimize the dielectric anisotropy ($\Delta\varepsilon$), refractive index anisotropy ($\Delta n$), and other properties for individual display devices.

A vertical alignment-mode display uses a liquid crystal composition having a negative $\Delta\varepsilon$. A horizontal alignment-mode display such as a TN, STN, or IPS-mode display uses a liquid crystal composition having a positive $\Delta\varepsilon$. In recent years, a drive mode with which a liquid crystal composition having a positive $\Delta\varepsilon$ is vertically aligned under absence of applied voltage and an image is displayed by applying an IPS/FFS-mode electric field has been reported and the necessity for a liquid crystal composition having a positive $\Delta\varepsilon$ is increasing. Meanwhile, low-voltage driving, high-speed response, and wide operation temperature range are required in all driving modes. In other words, $\Delta\varepsilon$ that is positive and has a large absolute value, a low viscosity ($\eta$), and a high nematic phase-isotropic liquid phase transition temperature ($T_{ni}$) are desirable. Moreover, due to the setting of $\Delta n \times d$, which is the product of $\Delta n$ and a cell gap (d), it is necessary to adjust the $\Delta n$ of the liquid crystal composition to be within an appropriate range according to the cell gap. In addition, since high-speed response is important in applying a liquid crystal display device to a television or the like, a liquid crystal composition with a small $\gamma_1$ is required.

Liquid crystal compositions that use compounds having a positive $\Delta\varepsilon$ and represented by formula (A-1) or (A-2) as the constitutional components of liquid crystal compositions have been disclosed (PTL 1 to PTL 4). However, these liquid crystal compositions do not achieve sufficiently low viscosity.

[Chem. 1]

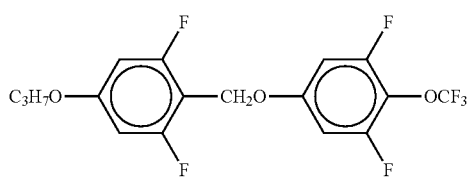

(A-1)

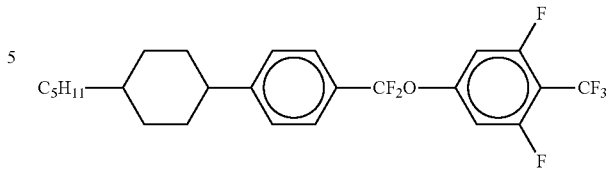

(A-2)

CITATION LIST

Patent Literature

PTL 1: WO96/032365
PTL 2: Japanese Unexamined Patent Application Publication No. 09-157202
PTL 3: WO98/023564
PTL 4: Japanese Unexamined Patent Application Publication No. 2003-183656

SUMMARY OF INVENTION

Technical Problem

An object of the present invention is to provide a liquid crystal composition that has refractive index anisotropy ($\Delta n$) adjusted to a desired level, a sufficiently low viscosity ($\eta$), and a positive dielectric anisotropy ($\Delta\varepsilon$) while degradation of the temperature range of the nematic phase is avoided by suppressing the decrease in nematic phase-isotropic liquid phase transition temperature ($T_{ni}$) and the increase in lower limit temperature of the nematic phase.

Solution to Problem

The inventors of the present invention have studied various fluorobenzene derivatives and found that the object can be achieved by combining specific compounds. Thus, the present invention has been made.

The present invention provides a liquid crystal composition having a positive dielectric anisotropy and containing one or more compounds selected from compounds represented by general formula (LC0) and one or more compounds selected from a group of compounds represented by general formula (LC1) to general formula (LC5) and to provide a liquid crystal display device that uses the liquid crystal composition.

[Chem. 2]

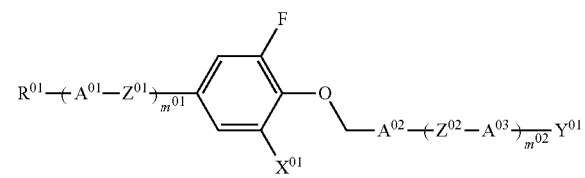

(LC0)

(LC1)

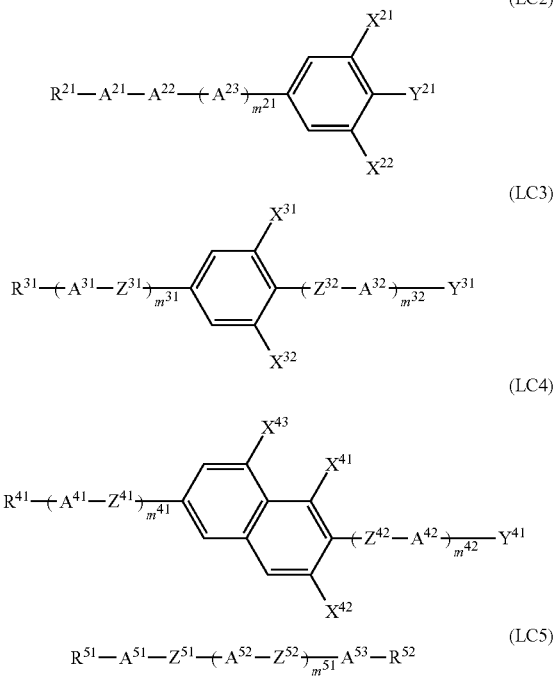

(LC2), (LC3), (LC4), (LC5)

(In the formulae, $R^{01}$ represents an alkenyl group having 2 to 5 carbon atoms, $R^{11}$ to $R^{41}$ each independently represent an alkyl group having 1 to 15 carbon atoms where one or more —$CH_2$— in the alkyl group may each be substituted with —O—, —CH=CH—, —CO—, —OCO—, —COO—, —C≡C—, —$CF_2O$—, or —$OCF_2$— so long as oxygen atoms are not directly adjacent to each other and one or more hydrogen atoms in the alkyl group may each be substituted with a halogen, $R^{51}$ and $R^{52}$ each independently represent an alkyl group having 1 to 15 carbon atoms where one or more —$CH_2$— in the alkyl group may each be substituted with —O—, —CH=CH—, —CO—, —OCO—, —COO—, or —C≡C— so long as oxygen atoms are not directly adjacent to each other, and may each represent —$OCF_3$ or —$CF_3$— when $A^{51}$ or $A^{53}$ below represents a cyclohexane ring, $A^{01}$ to $A^{42}$ each independently represent any one of the structures below:

[Chem. 3]

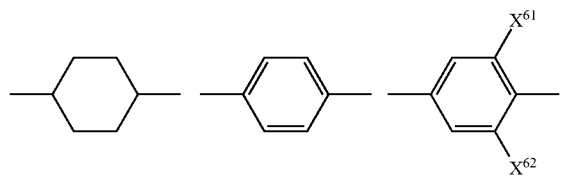

(In the structures, one or more —$CH_2$— in the cyclohexane ring may each be substituted with —O— so long as oxygen atoms are not directly adjacent to each other, one or more —CH= in the benzene ring may each be substituted with —N= so long as nitrogen atoms are not directly adjacent to each other, and $X^{61}$ and $X^{62}$ each independently represent —H, —Cl, —F, —$CF_3$, or —$OCF_3$.), $A^{51}$ to $A^{53}$ each independently represent any one of the structures below:

[Chem. 4]

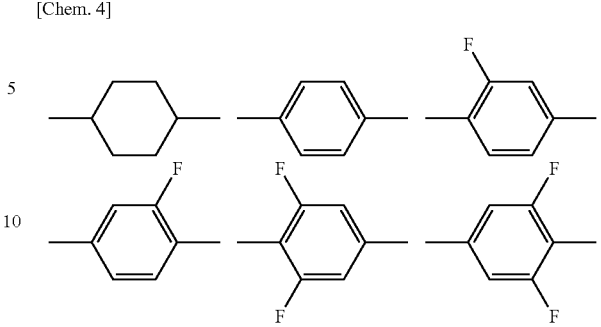

(In the formulae, one or more —$CH_2CH_2$— in the cyclohexane ring may each be substituted with —CH=CH—, —$CF_2O$—, or —$OCF_2$—, and one or more —CH= in the benzene ring may each be substituted with —N= so long as nitrogen atoms are not directly adjacent to each other), $X^{01}$ represents a hydrogen atom or a fluorine atom, $X^{11}$ to $X^{43}$ each independently represent —H, —Cl, —F, —$CF_3$, or —$OCF_3$, $Y^{01}$ to $Y^{41}$ each represent —Cl, —F, —$OCHF_2$, —$CF_3$, or —$OCF_3$, $Z^{01}$ and $Z^{02}$ each independently represent a single bond, —CH=CH—, —C≡C—, —$CH_2CH_2$—, —$(CH_2)_4$—, —$OCF_2$—, or —$CF_2O$—, $Z^{31}$ to $Z^{42}$ each independently represent a single bond, —CH=CH—, —C≡C—, —$CH_2CH_2$—, —$(CH_2)_4$—, —$OCF_2$—, or —$CF_2O$—, at least one of $Z^{31}$ and $Z^{32}$ that are present represents a group other than a single bond, $Z^{51}$ and $Z^{52}$ each independently represent a single bond, —CH=CH—, —C≡C—, —$CH_2CH_2$—, —$(CH_2)_4$—, —$OCH_2$—, —$CH_2O$—, —$OCF_2$—, or —$CF_2O$—, $m^{01}$ to $m^{51}$ each independently represent an integer of 0 to 3, $m^{01}+m^{02}$, $m^{31}+m^{32}$, and $m^{41}+m^{42}$ are each independently 1, 2, 3, or 4, and when a plurality of $A^{01}$, $A^{03}$, $A^{23}$, $A^{31}$, $A^{32}$, $A^{41}$, $A^{42}$, $A^{52}$, $Z^{01}$, $Z^{02}$, $Z^{31}$, $Z^{32}$, $Z^{41}$, $Z^{42}$, and/or $Z^{52}$ are present, they may be the same or different.)

Advantageous Effects of Invention

The liquid crystal composition of the present invention is characterized in that the absolute value of Δ∈ can be increased although Δ∈ is a positive value. Moreover, η is low, the rotational viscosity ($\gamma_1$) is small, liquid crystal properties are excellent, and a stable liquid crystal phase is exhibited over a wide temperature range. Moreover, the liquid crystal composition is chemically stable against heat, light, water, etc., allows low-voltage driving, and has practical use and high reliability.

DESCRIPTION OF EMBODIMENTS

A liquid crystal composition according to the invention of the present application contains one or more compounds selected from compounds represented by general formula (LC0) above and one or more compounds selected from a compound group consisting of compounds represented by general formulae (LC1) to (LC5). Since a liquid crystal composition containing compounds represented by general formula (LC0) and compounds represented by general formulae (LC1) to (LC5) exhibits a stable liquid crystal phase even at low temperature, the liquid crystal composition can be regarded as a practical liquid crystal composition.

$R^{01}$ in general formula (LC0) represents an alkenyl group having 2 to 5 carbon atoms and is preferably selected from the groups represented by formula (R1) to formula (R5).

[Chem. 5]

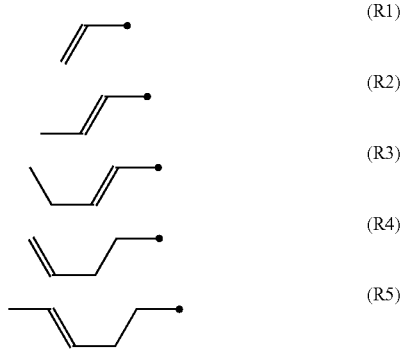

(In each formula, the black dot represents a bonding point to a ring.)

A compound represented by general formula (LC0) with $R^{01}$ representing an alkyl group having 1 to 8 carbon atoms or an alkoxy group having 1 to 8 carbon atoms is preferably used in combination.

In general formula (LC1) to general formula (LC5), $R^{11}$ to $R^{52}$ preferably each independently represent an alkyl group having 1 to 8 carbon atoms, an alkenyl group having 2 to 8 carbon atoms, or an alkoxy group having 1 to 8 carbon atoms and are preferably linear. When $R^{11}$ to $R^{52}$ are to represent alkenyl groups, $R^{11}$ to $R^{52}$ are preferably each selected from the groups represented by formula (R1) to formula (R5) above. In the case where $A^{01}$, $A^{11}$, $A^{21}$, $A^{31}$, $A^{41}$, $A^{51}$, and $A^{53}$ each represent a trans-1,4-cyclohexylene group, formula (R1), formula (R2), and formula (R4) are more preferable. It is yet more preferable to contain at least one compound represented by general formula (LC5) with at least one of $R^{51}$ and $R^{53}$ representing an alkenyl group selected from those represented by formula (R1) to formula (R5).

$A^{01}$ to $A^{42}$ preferably each independently represent a trans-1,4-cyclohexylene group, a 1,4-phenylene group, a 3-fluoro-1,4-phenylene group, a 3,5-difluoro-1,4-phenylene group, or a tetrahydropyran-2,5-diyl group. If some of $A^{01}$ to $A^{42}$ are to represent tetrahydropyran-2,5-diyl groups, $A^{01}$, $A^{11}$, $A^{21}$, $A^{31}$, and $A^{41}$ preferably represent tetrahydropyran-2,5-diyl groups.

$A^{51}$ to $A^{53}$ preferably each independently represent a trans-1,4-cyclohexylene group, a 1,4-phenylene group, a 3-fluoro-1,4-phenylene group, or a 2-fluoro-1,4-phenylene group.

$Z^{01}$ and $Z^{02}$ preferably each independently represent a single bond, —CH=CH—, —C≡C—, —CH$_2$CH$_2$—, —OCF$_2$—, or —CF$_2$O—. When one of $Z^{01}$ and $Z^{02}$ that are present represents —CH=CH—, —C≡C—, —CH$_2$CH$_2$—, —(CH$_2$)$_4$—, —OCF$_2$—, or —CF$_2$O—, the other preferably represents a single bond. More preferably, both $Z^{01}$ and $Z^{02}$ represent single bonds.

$Z^{31}$ to $Z^{42}$ preferably each independently represent a single bond, —CH=CH—, —C≡C—, —CH$_2$CH$_2$—, —OCH$_2$—, —CH$_2$O—, —OCF$_2$—, or —CF$_2$O—. When one of $Z^{31}$ to $Z^{42}$ that are present represents —CH=CH—, —C≡C—, —CH$_2$CH$_2$—, —(CH$_2$)$_4$—, —OCF$_2$—, or —CF$_2$O—, the others preferably represent single bonds.

$Z^{51}$ and $Z^{52}$ preferably each independently represent a single bond, —CH=CH—, —C≡C—, —CH$_2$CH$_2$—, —OCF$_2$—, or —CF$_2$O—. When one of $Z^{51}$ and $Z^{52}$ that are present represents —CH=CH—, —C≡C—, —CH$_2$CH$_2$—, —(CH$_2$)$_4$—, —OCH$_2$—, —CH$_2$O—, —OCF$_2$—, or —CF$_2$O—, the other preferably represents a single bond. More preferably, both $Z^{51}$ and $Z^{52}$ represent single bonds.

$X^{01}$ in general formula (LC0) particularly preferably represents F since the viscosity (η) can be notably decreased relative to a large dielectric anisotropy (Δ∈) or about the same level of dielectric anisotropy (Δ∈). $X^{11}$ to $X^{43}$ preferably each independently represent H or F and $X^{11}$, $X^{21}$, $X^{31}$, and $X^{41}$ preferably each represent F.

$Y^{01}$ to $Y^{41}$ particularly preferably each independently represent F, CF$_3$, or OCF$_3$. While $m^{01}$ to $m^{51}$ can each independently represent an integer of 0 to 3, $m^{01}+m^{02}$ is particularly preferably 1 or 2, $m^{21}$ is particularly preferably 0, $m^{31}+m^{32}$ is particularly preferably 1, 2, or 3, and $m^{41}+m^{42}$ is particularly preferably 1 or 2.

The liquid crystal compound represented by general formula (LC0) is more preferably a compound represented by any one of general formulae (LC0-a) to (LC0-h) below (In the formulae, $R^{01}$, $A^{01}$, $A^{02}$, $A^{03}$, $Z^{01}$, $Z^{02}$, $X^{01}$, and $Y^{01}$ are the same as those in general formula (LC0). When two or more $A^{01}$, $A^{03}$ and/or $Z^{01}$, $Z^{02}$ are present, they may be the same or different):

[Chem. 6]

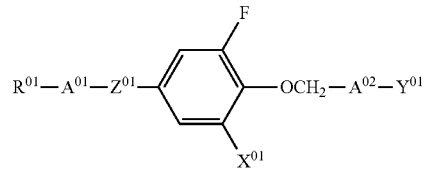
(LC0-a)

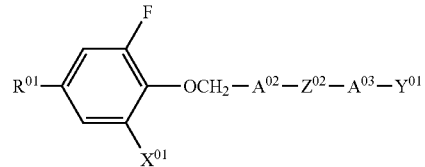
(LC0-b)

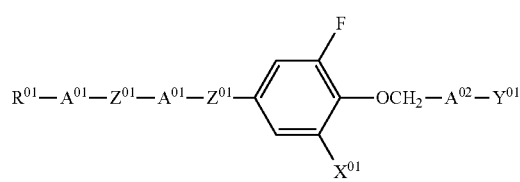
(LC0-c)

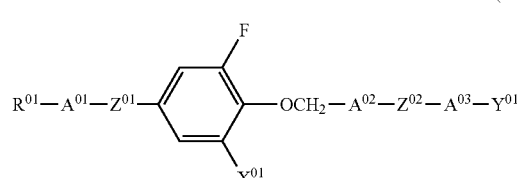
(LC0-d)

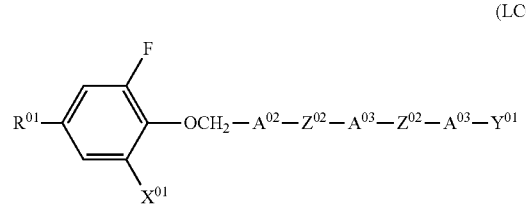
(LC0-e)

(LC0-f)
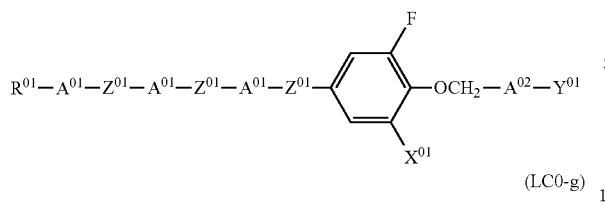
(LC0-g)
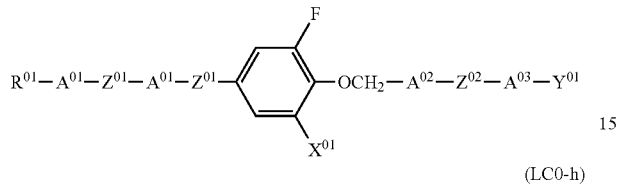
(LC0-h)
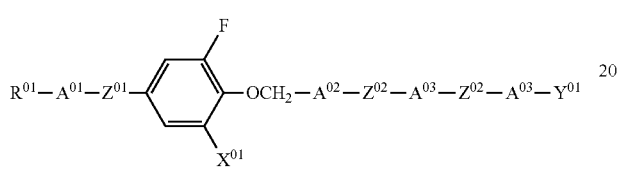
The liquid crystal compound represented by general formula (LC0) is more preferably a compound represented by a general formula selected from general formula (LC0-1) to general formula (LC0-111) below:
[Chem. 7]
(LC0-1)
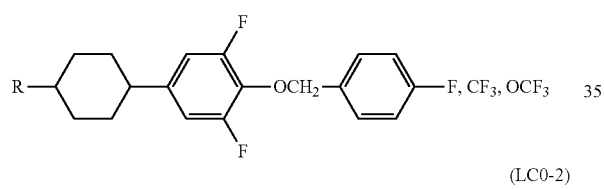
(LC0-2)
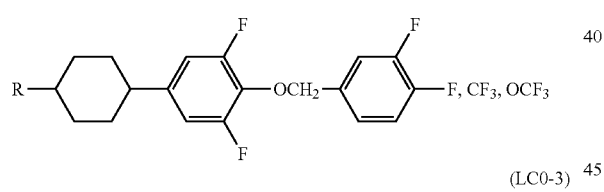
(LC0-3)
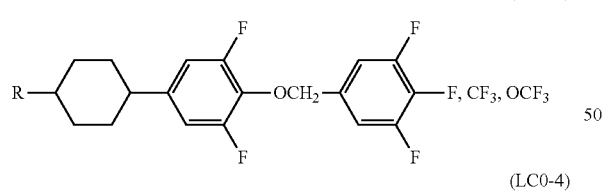
(LC0-4)
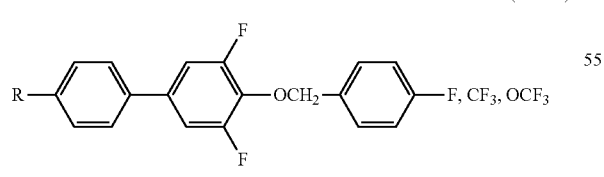
(LC0-5)
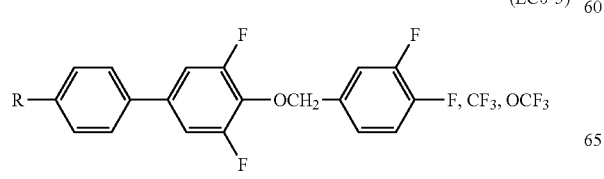
(LC0-6)
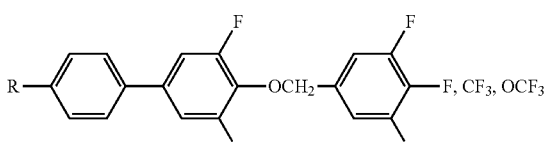
(LC0-7)
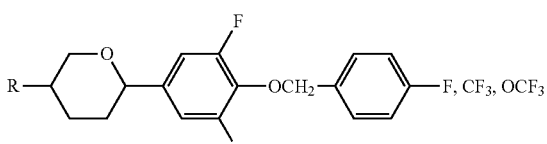
(LC0-8)
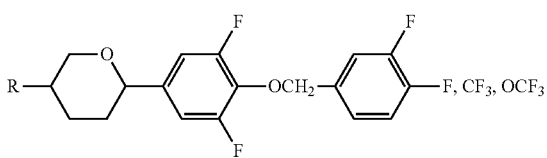
(LC0-9)
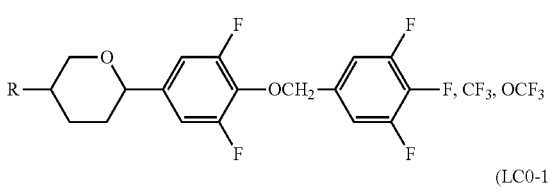
(LC0-10)
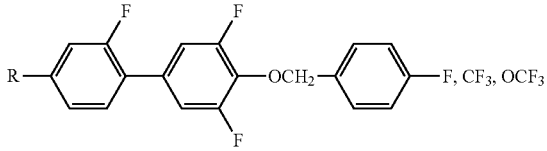
(LC0-11)
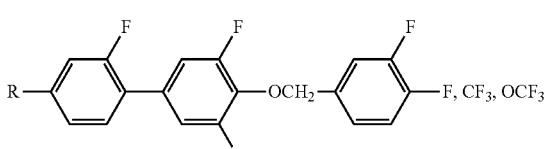
(LC0-12)
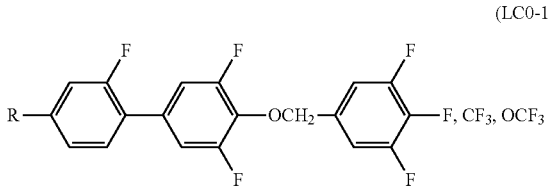
(LC0-13)
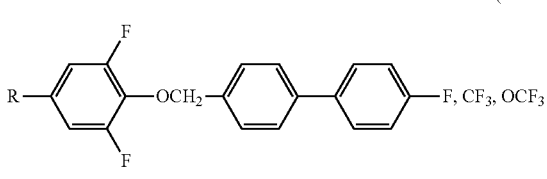
(LC0-14)
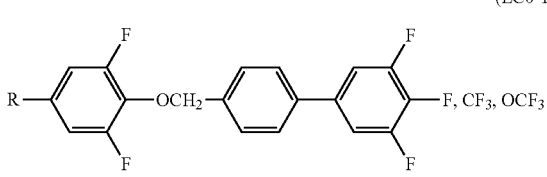

-continued
(LC0-15) 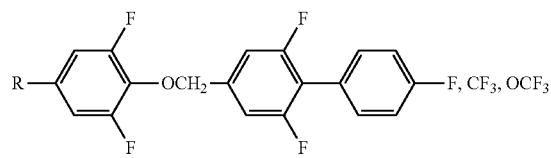
(LC0-16) 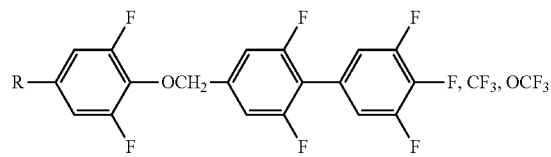
(LC0-17) 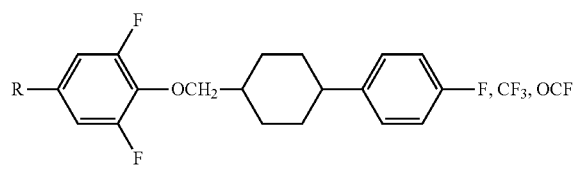
(LC0-18) 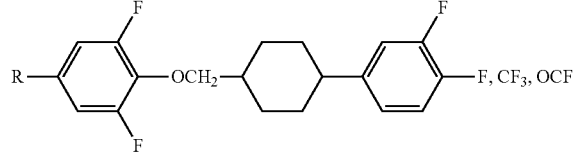
(LC0-19) 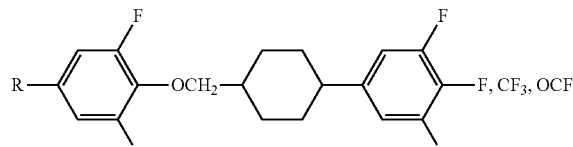
[Chem. 8]
(LC0-20) 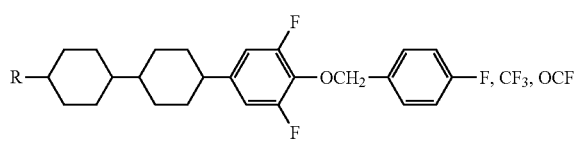
(LC0-21) 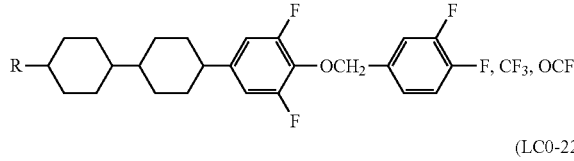
(LC0-22) 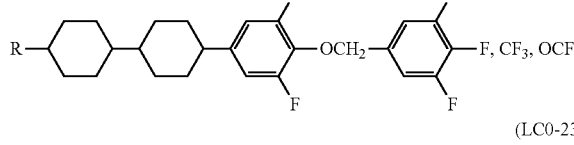
(LC0-23) 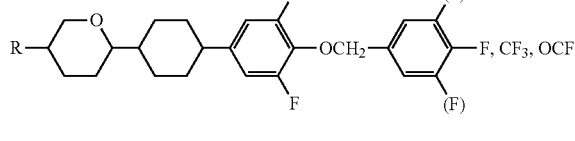
(LC0-24) 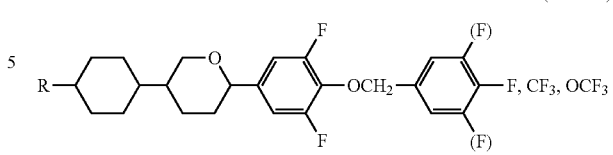
(LC0-25) 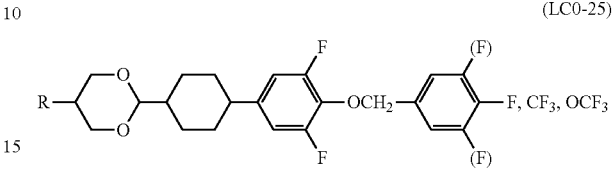
(LC0-26) 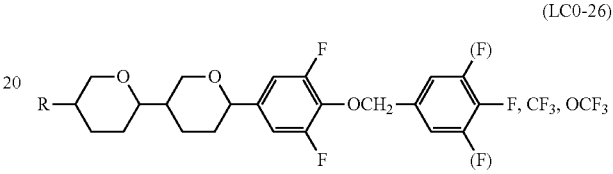
(LC0-27) 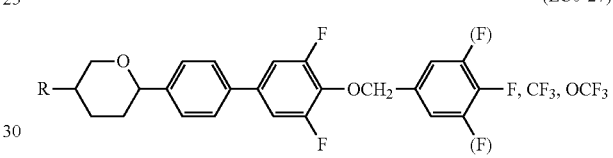
(LC0-28) 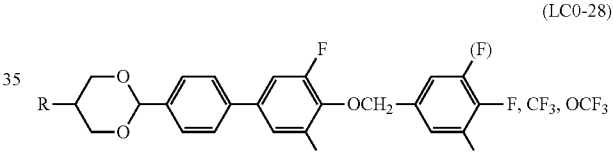
(LC0-29) 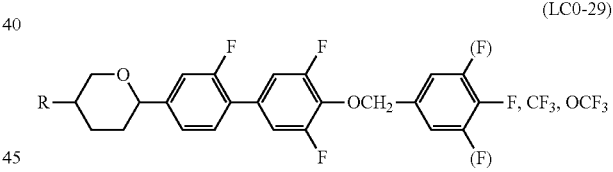
(LC0-30) 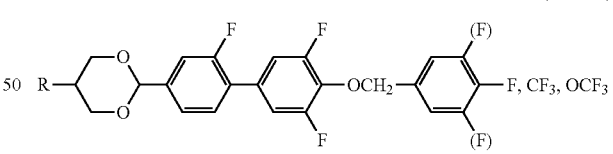
(LC0-31) 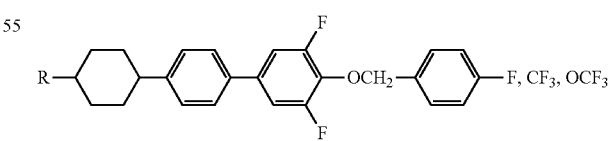
(LC0-32) 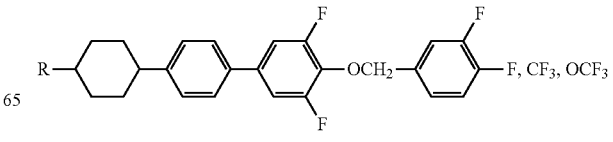

(LC0-33) 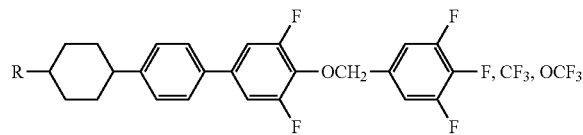
(LC0-34) 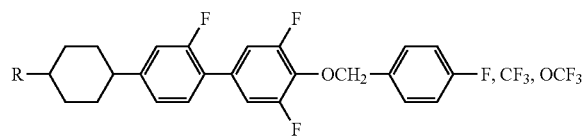
(LC0-35) 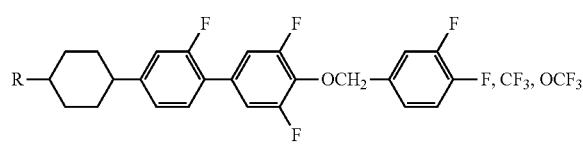
(LC0-36) 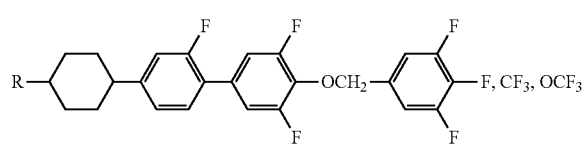
(LC0-37) 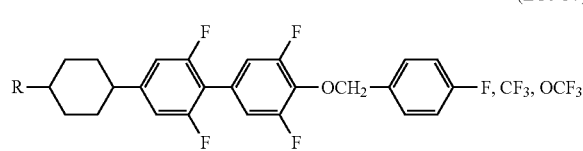
(LC0-38) 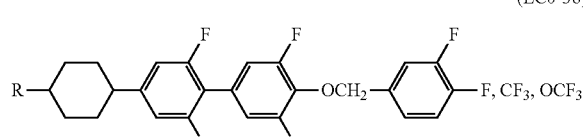
(LC0-39) 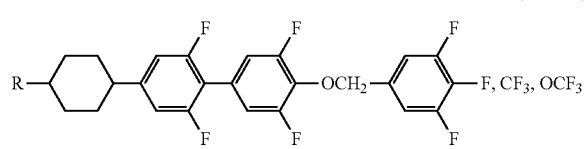
(LC0-40) 
(LC0-41) 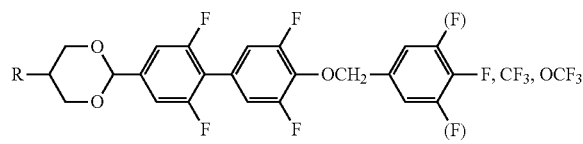
(LC0-42) 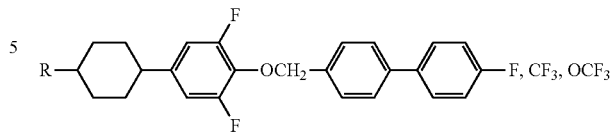
(LC0-43) 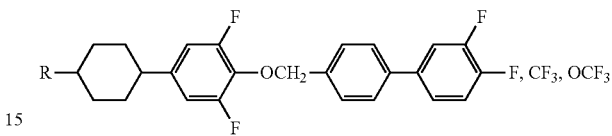
(LC0-44) 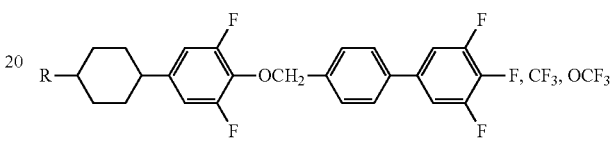
(LC0-45) 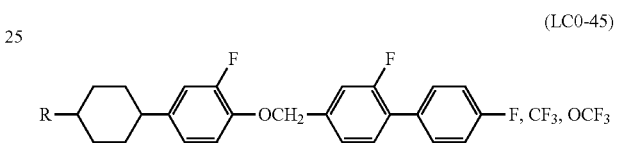
(LC0-46) 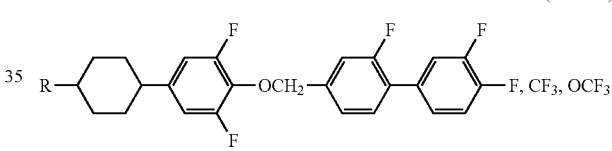
(LC0-47) 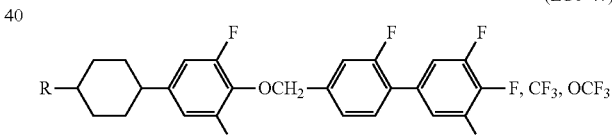
(LC0-48) 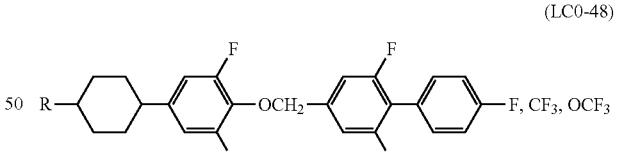
(LC0-49) 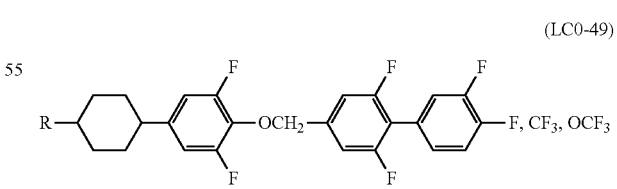
(LC0-50) 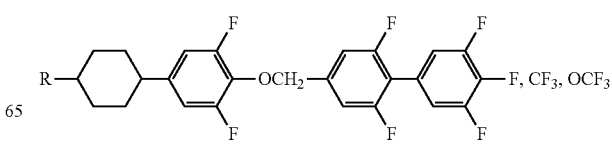

(LC0-51) 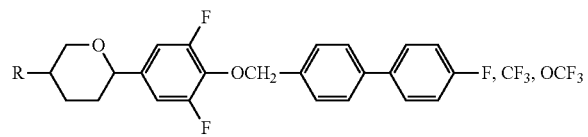
(LC0-52) 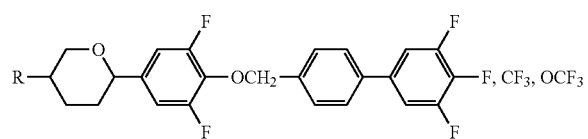
(LC0-53) 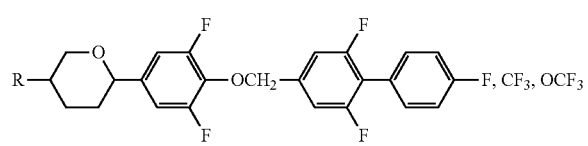
[Chem. 9]
(LC0-54) 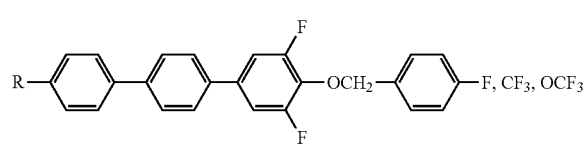
(LC0-55) 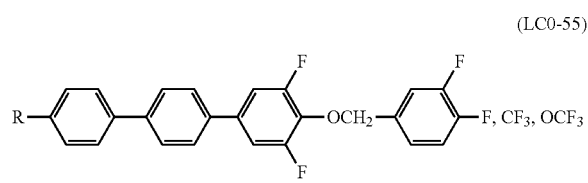
(LC0-56) 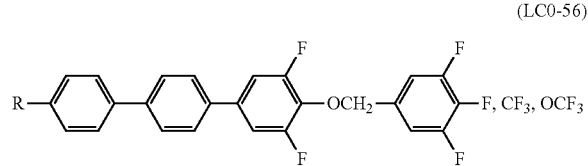
(LC0-57) 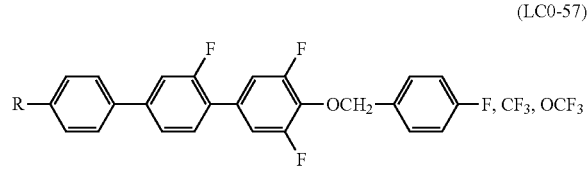
(LC0-58) 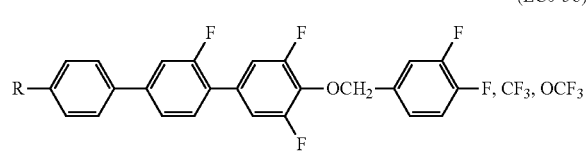
(LC0-59) 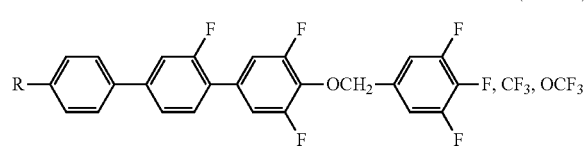
(LC0-60) 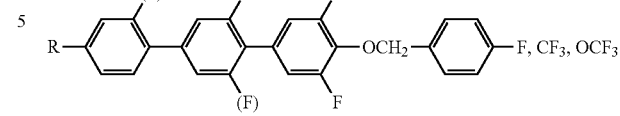
(LC0-61) 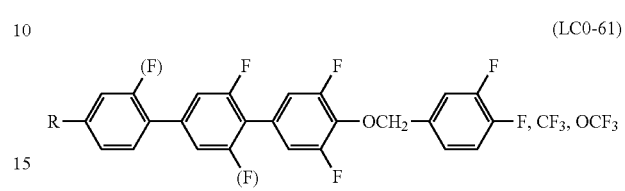
(LC0-62) 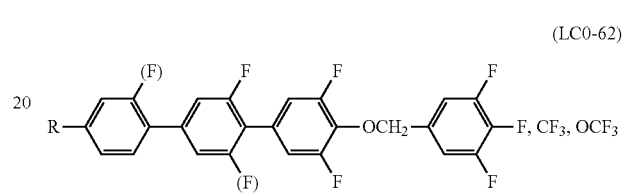
(LC0-63) 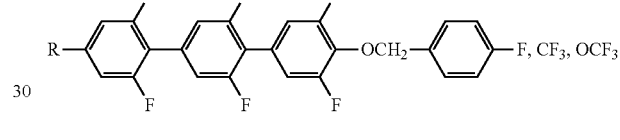
(LC0-64) 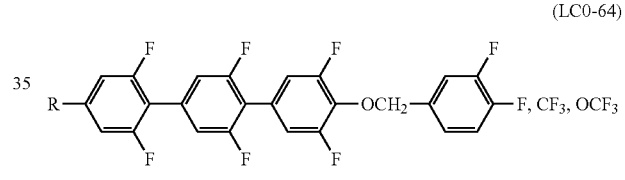
(LC0-65) 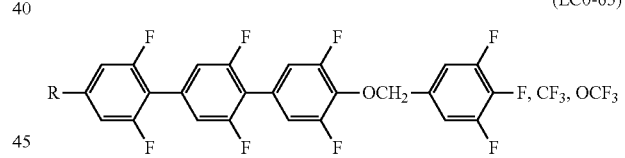
(LC0-66) 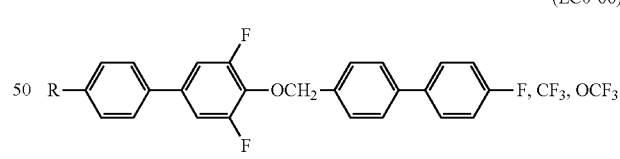
(LC0-67) 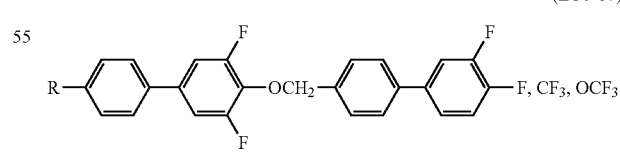
(LC0-68) 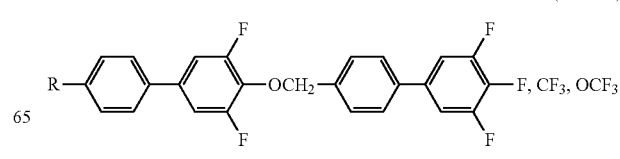

(LC0-69)
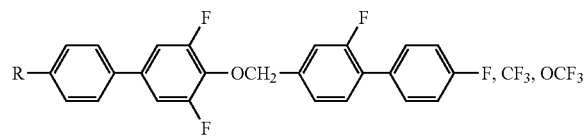
(LC0-70)
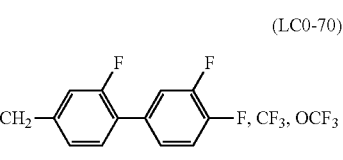
(LC0-71)
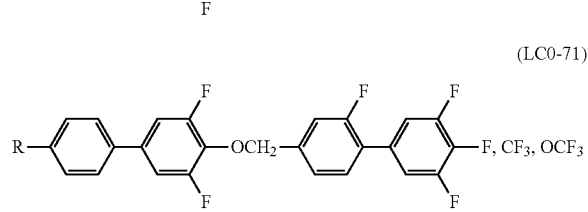
(LC0-72)
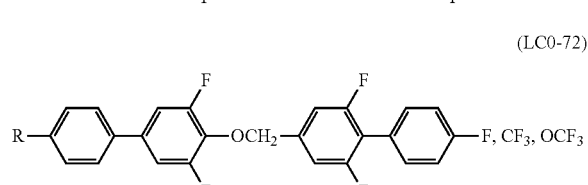
(LC0-73)
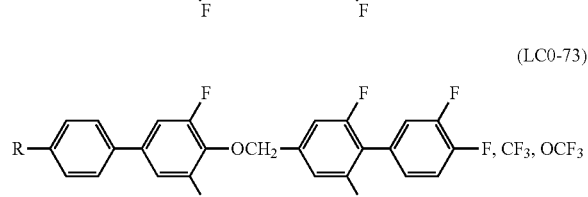
(LC0-74)
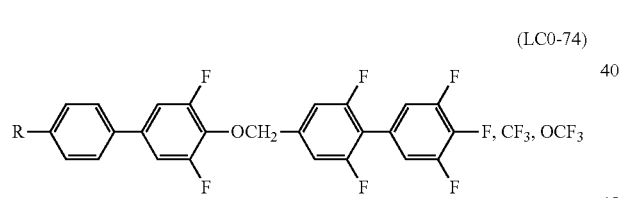
(LC0-75)
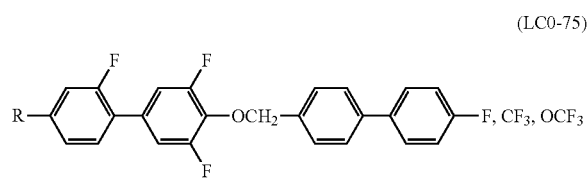
(LC0-76)
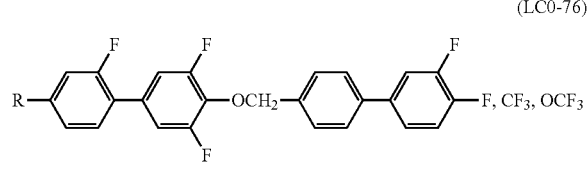
(LC0-77)
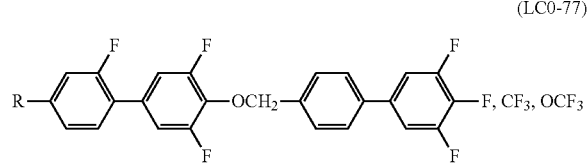
(LC0-78)
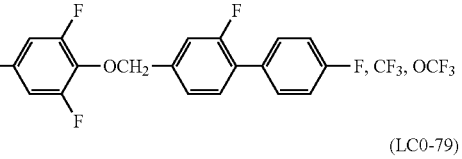
(LC0-79)
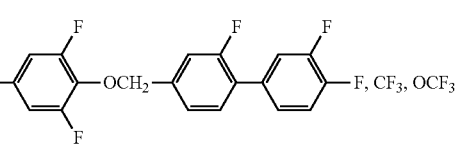
(LC0-80)
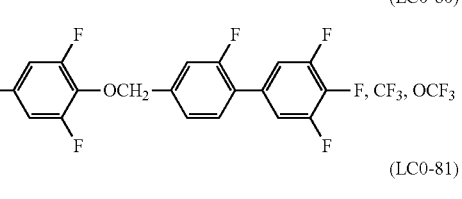
(LC0-81)
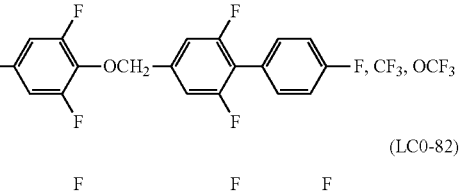
(LC0-82)
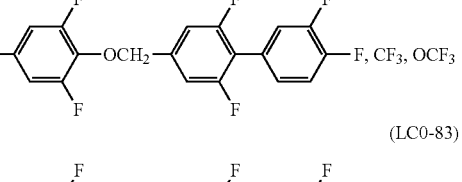
(LC0-83)
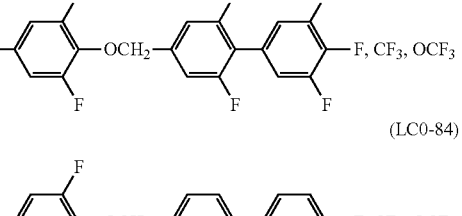
(LC0-84)
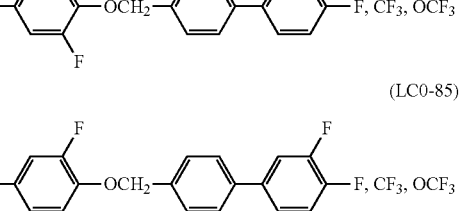
(LC0-85)
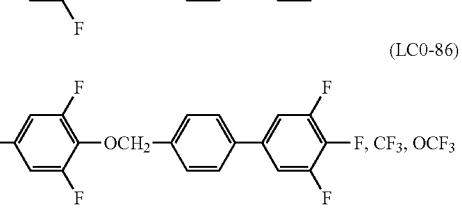
(LC0-86)
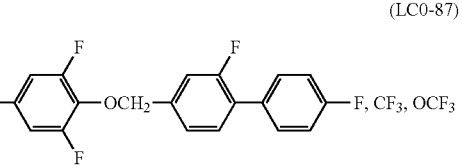
(LC0-87)

(LC0-88)
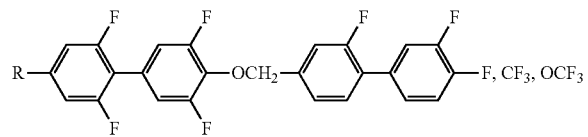
(LC0-89)
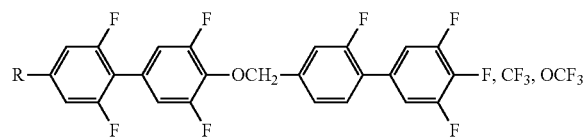
(LC0-90)
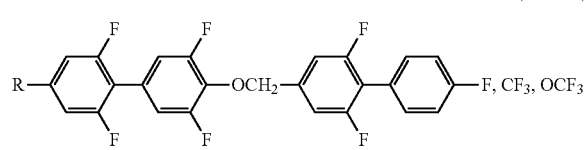
(LC0-91)
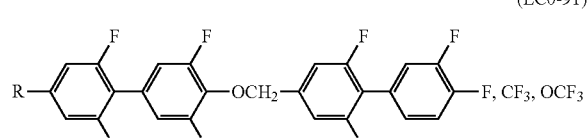
(LC0-92)
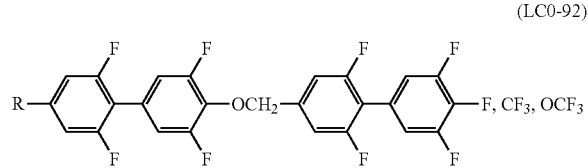
[Chem. 10]
(LC0-93)
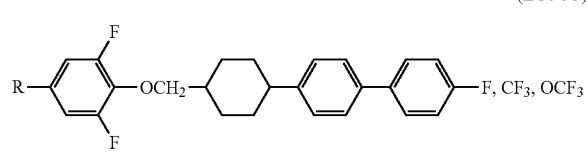
(LC0-94)
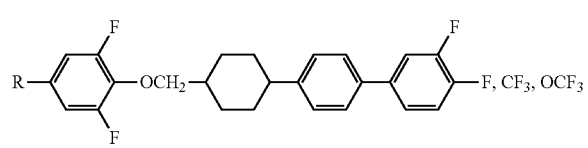
(LC0-95)
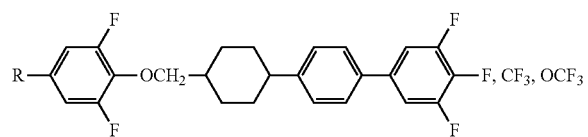
(LC0-96)
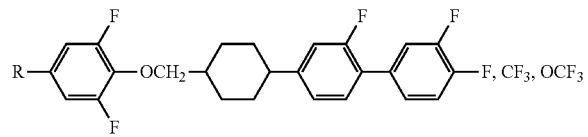
(LC0-97)
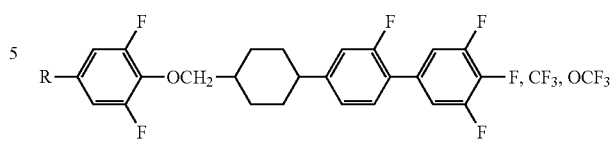
(LC0-98)
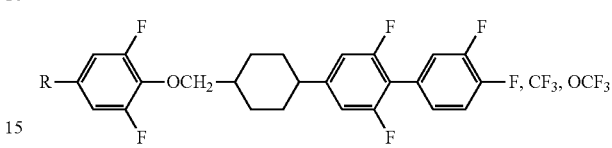
(LC0-99)
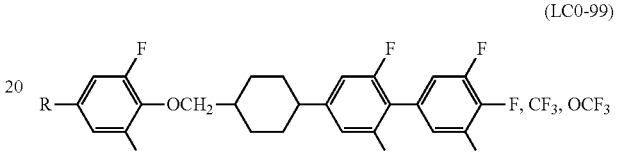
(LC0-100)
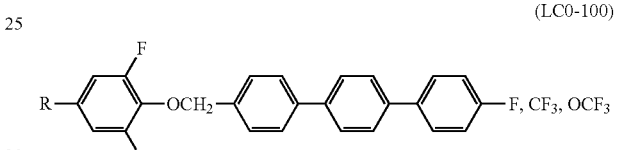
(LC0-101)
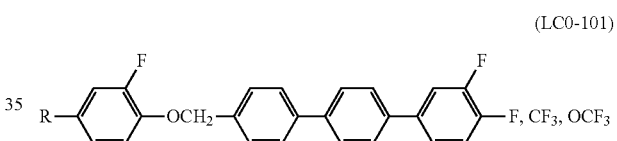
(LC0-102)
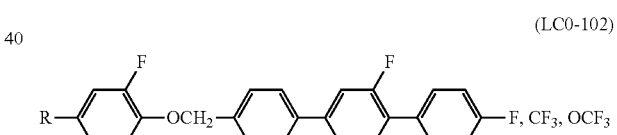
(LC0-103)
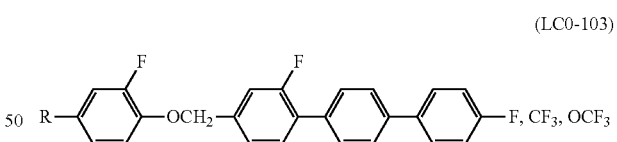
(LC0-104)
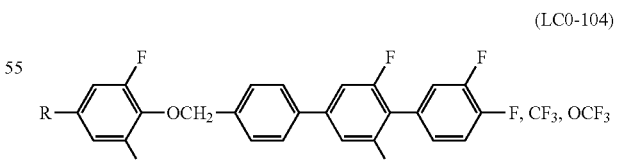
(LC0-105)
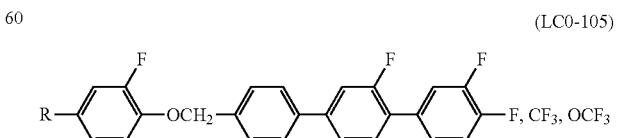

-continued

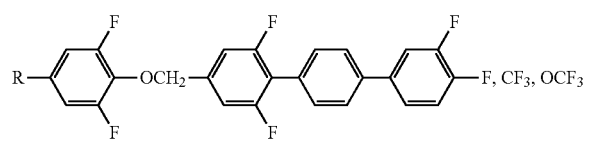
(LC0-106)

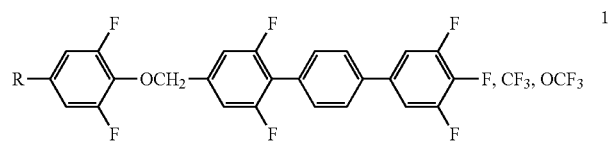
(LC0-107)

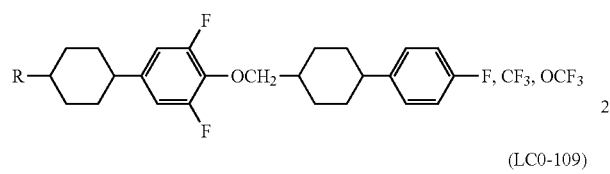
(LC0-108)

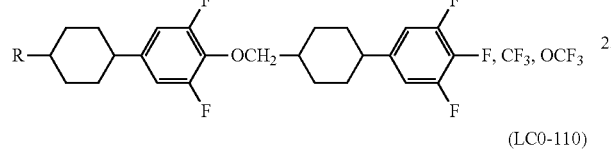
(LC0-109)

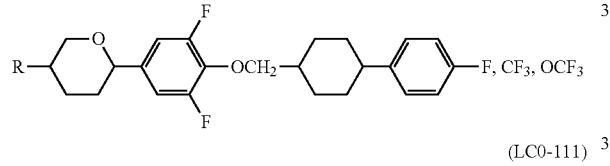
(LC0-110)

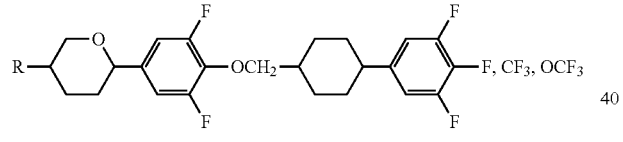
(LC0-111)

(In the formulae, R is the same as $R^{01}$ in general formula (LC0), "—F, $CF_3$, $OCF_3$" means that $Y^{01}$ each independently represent one of —F, $CF_3$, and $OCF_3$, and "(—F)" represents H or F as a substituent.) Compounds represented by general formula (LC0-1) to general formula (LC0-19) are particularly preferable since they have high dielectric anisotropy (Δ∈), notably low viscosity (η), and preferable compatibility. Compounds represented by general formulae (LC0-20) to (LC0-111) are particularly preferable since they have high dielectric anisotropy (Δ∈), relatively low viscosity (η), and a high nematic phase-isotropic liquid phase transition temperature ($T_{ni}$).

The compounds represented by general formula (LC2) are more preferably compounds represented by general formula (LC2-1) to general formula (LC2-14) below:

[Chem. 11]

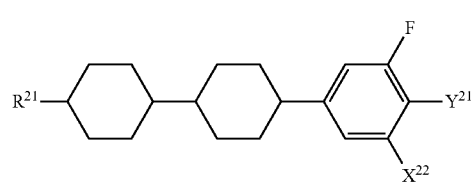
(LC2-1)

-continued

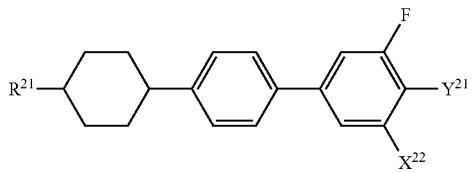
(LC2-2)

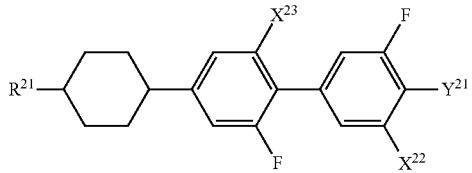
(LC2-3)

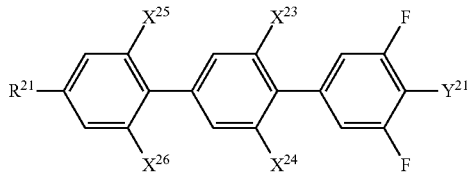
(LC2-4)

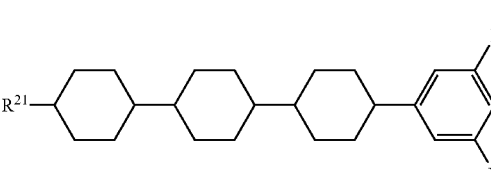
(LC2-5)

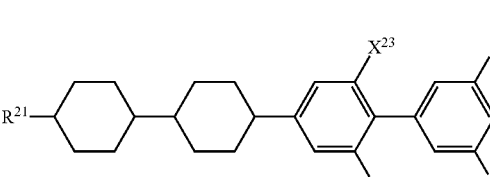
(LC2-6)

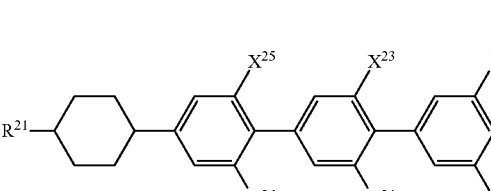
(LC2-7)

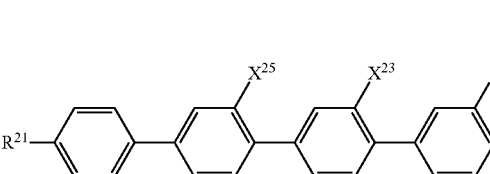
(LC2-8)

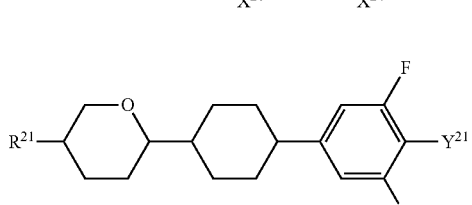
(LC2-9)

-continued (LC2-10)
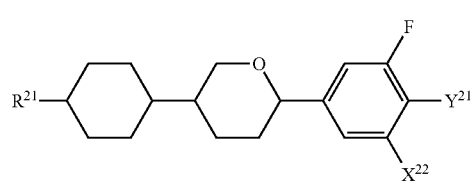

(LC2-11)
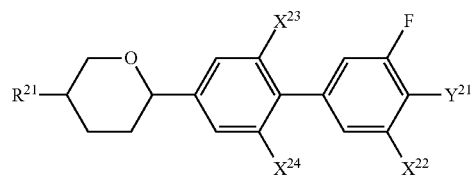

(LC2-12)
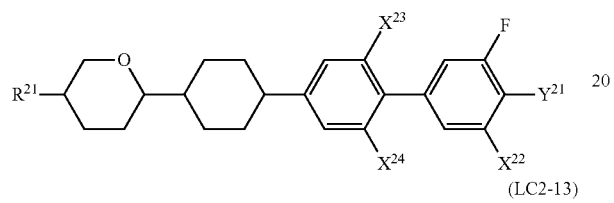

(LC2-13)
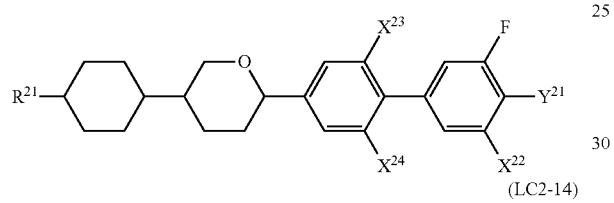

(LC2-14)
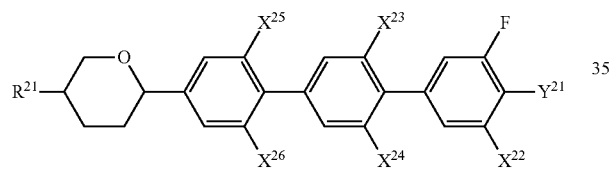

(In the formulae, $X^{23}$, $X^{24}$, $X^{25}$, and $X^{26}$ each independently represent a hydrogen atom, Cl, F, CF$_3$, or OCF$_3$, and $X^{22}$, $R^{21}$, and $Y^{21}$ are the same as those in general formula (LC2).) The group of compounds represented by general formula (LC2-1) to general formula (LC2-4) and general formula (LC2-9) to general formula (LC2-11) is yet more preferable.

The compounds represented by general formula (LC3) are more preferably compounds represented by general formula (LC3-1) to general formula (LC3-32) below:

[Chem. 12]

(LC3-1)
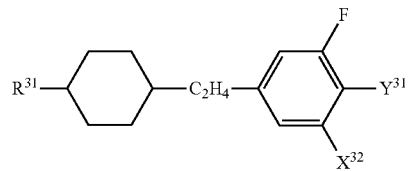

(LC3-2)
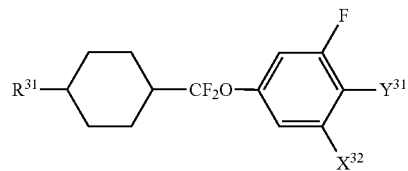

-continued (LC3-3)
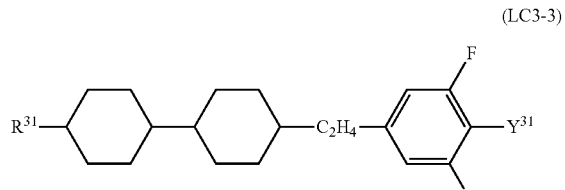

(LC3-4)
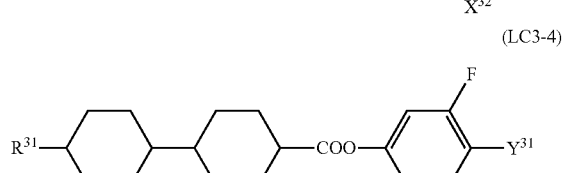

(LC3-5)

(LC3-6)
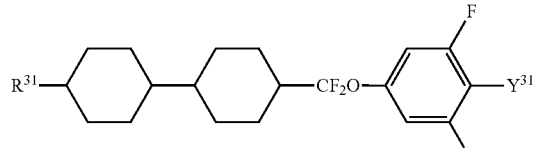

(LC3-7)
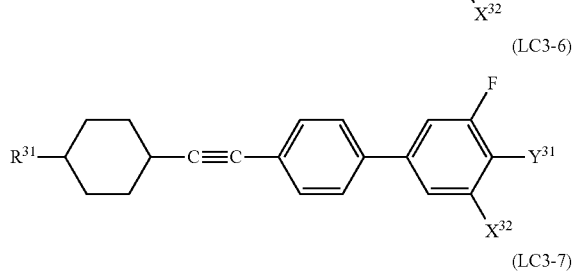

(LC3-8)
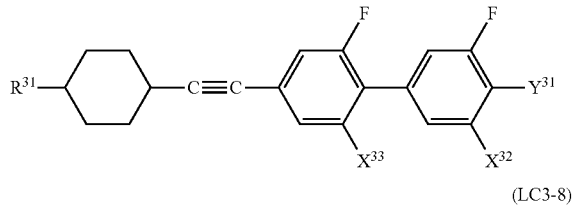

(LC3-9)
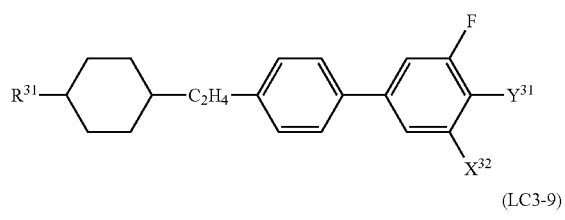

(LC3-10)
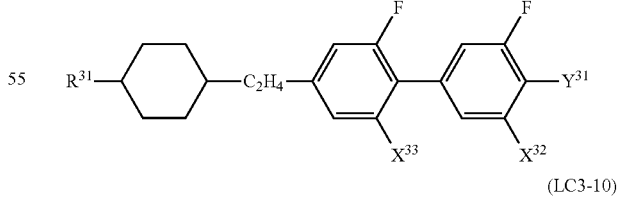

(LC3-11) 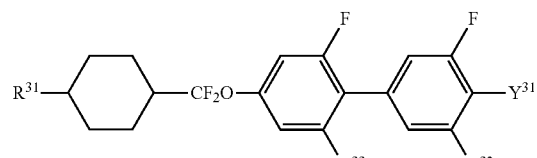
(LC3-12) 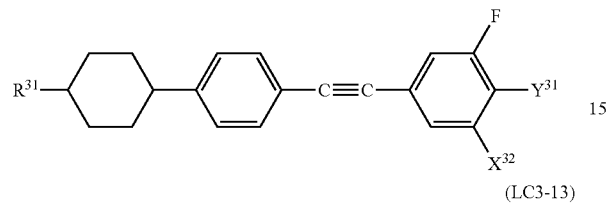
(LC3-13) 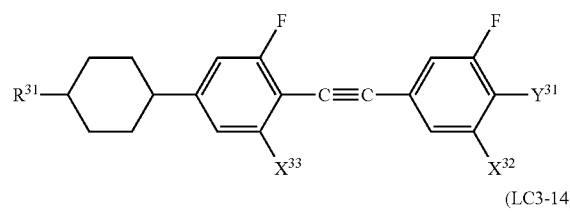
(LC3-14) 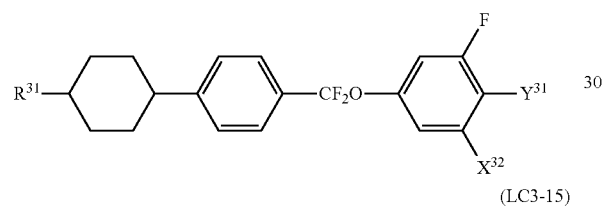
(LC3-15) 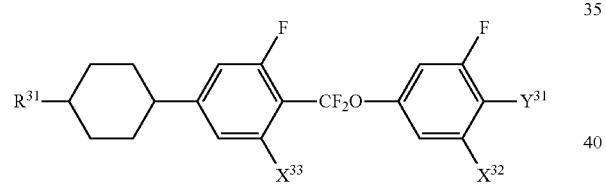
[Chem. 13]
(LC3-16) 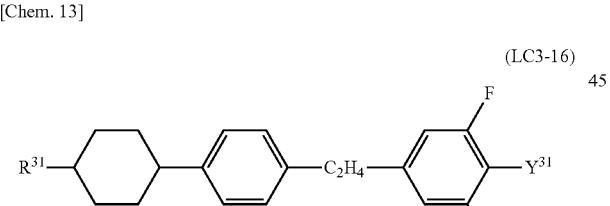
(LC3-17) 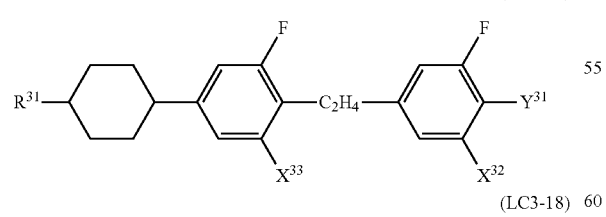
(LC3-18) 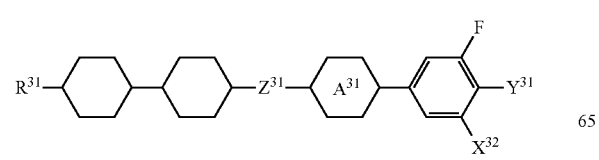
(LC3-19) 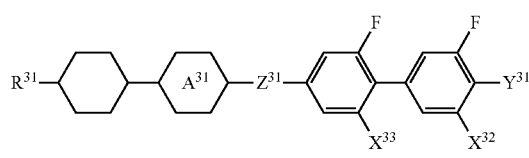
(LC3-20) 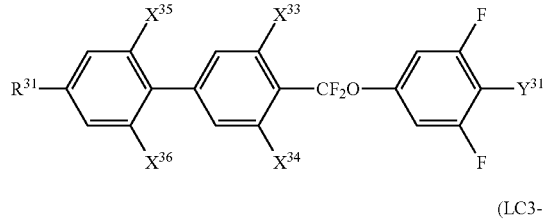
(LC3-21) 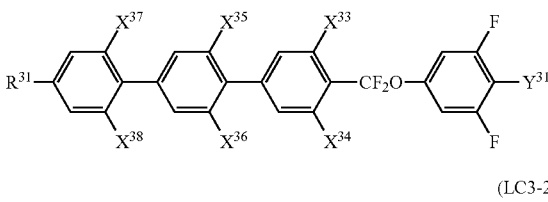
(LC3-22) 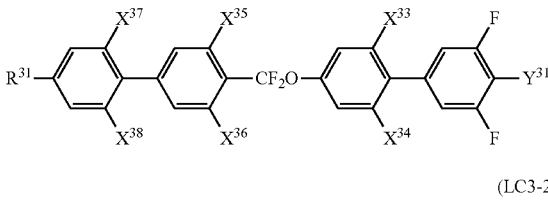
(LC3-23) 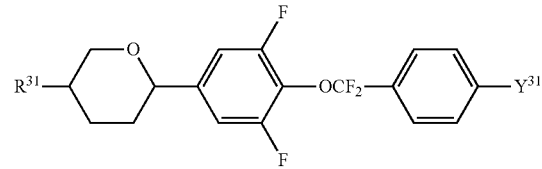
(LC3-24) 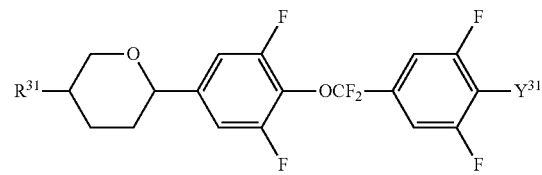
(LC3-25) 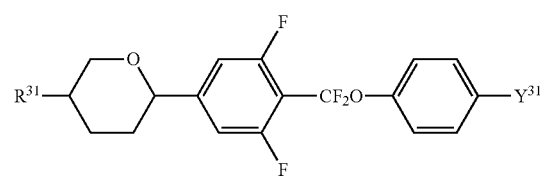
(LC3-26) 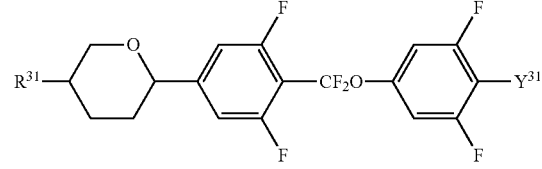

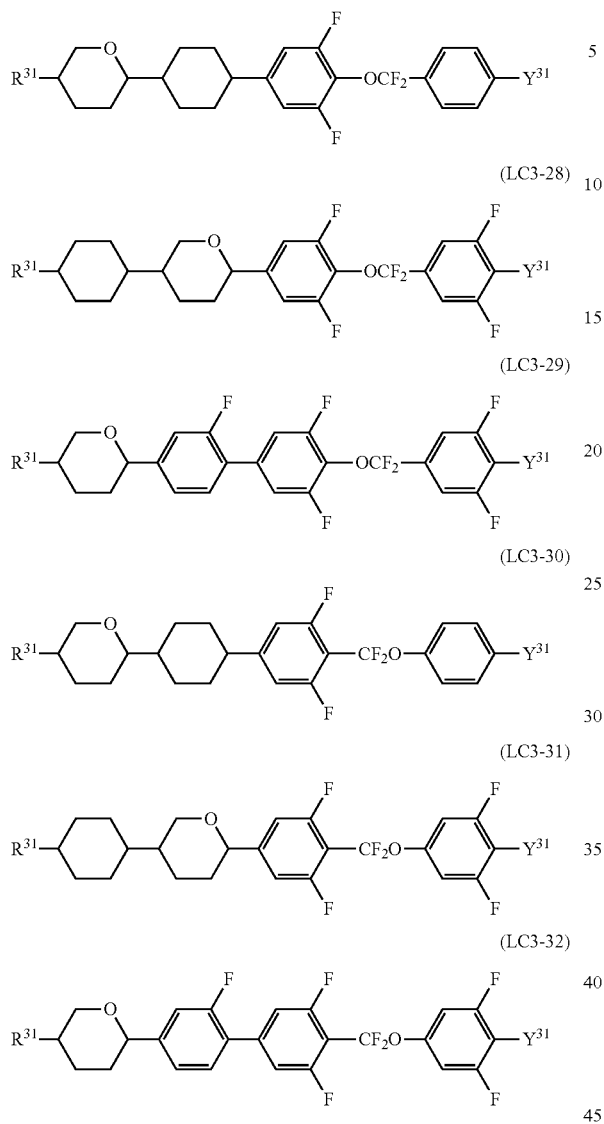

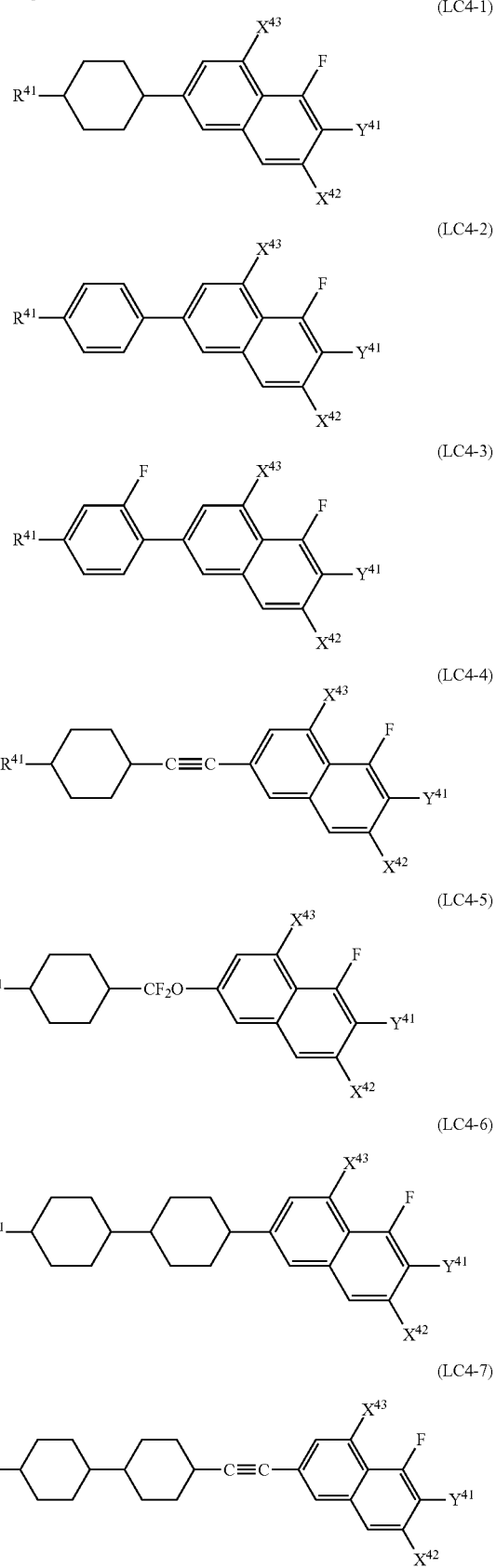

(In the formulae, $X^{33}$, $X^{34}$, $X^{35}$, $X^{36}$, $X^{37}$, and $X^{38}$ each independently represent H, Cl, F, $CF_3$, or $OCF_3$, and $X^{32}$, $R^{31}$, $A^{31}$ $Y^{31}$ and $Z^{31}$ are the same as those in general formula (LC3).) Among these, the group of compounds represented by general formula (LC3-5), general formula (LC3-15), and general formula (LC3-20) to general formula (LC3-32) is more preferably used in combination with the essential component of the present invention represented by general formula (LC0). More preferable is a compound selected from the group of compounds represented by general formula (LC3-20) and general formula (LC3-21) with $X^{33}$ and $X^{34}$ each representing F or the group of tetrahydropyran-ring-containing compounds represented by general formula (LC3-25), general formula (LC3-26), and general formula (LC3-30) to general formula (LC3-32).

The compounds represented by general formula (LC4) are more preferably compounds represented by general formula (LC4-1) to general formula (LC4-23) below:

(LC4-8)
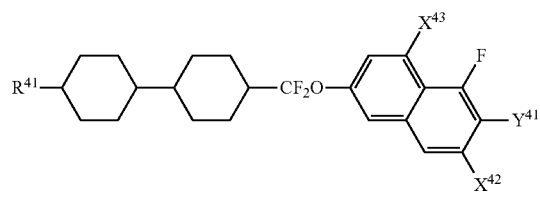
(LC4-9)
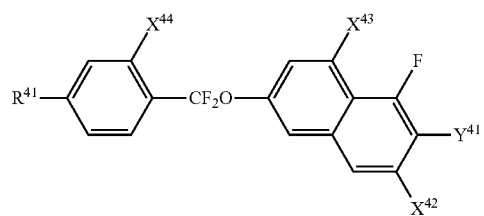
(LC4-10)
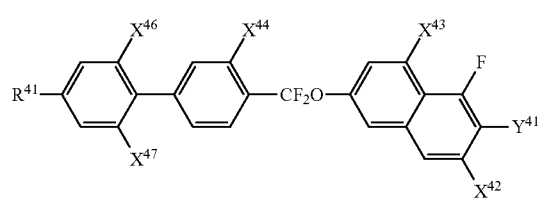
(LC4-11)
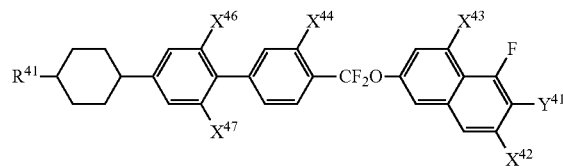
[Chem. 15]
(LC4-12)
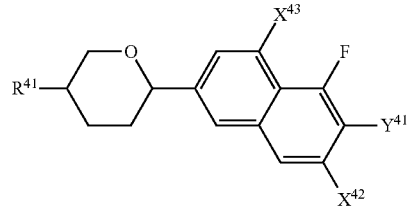
(LC4-13)
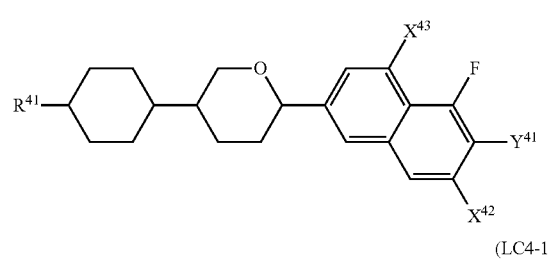
(LC4-14)
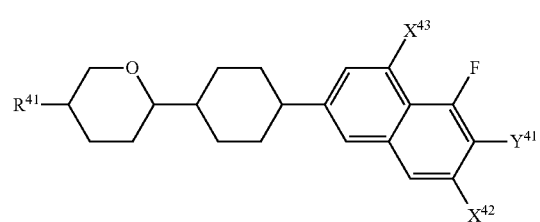
(LC4-15)
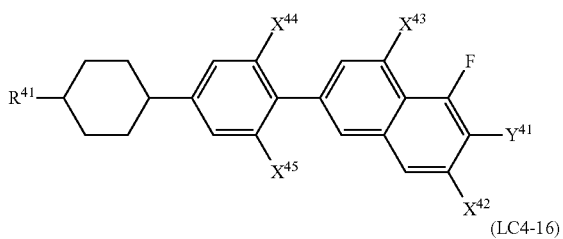
(LC4-16)
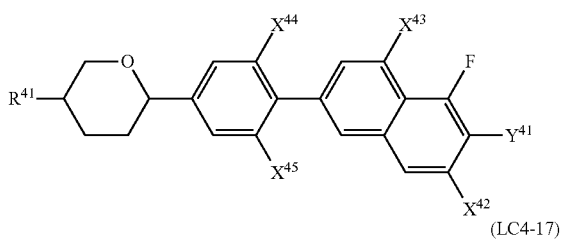
(LC4-17)
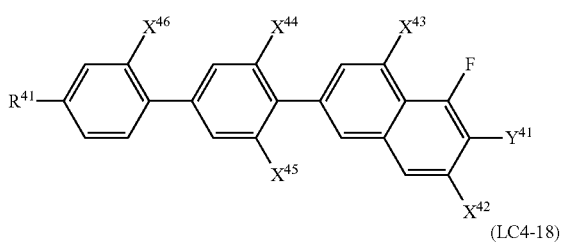
(LC4-18)
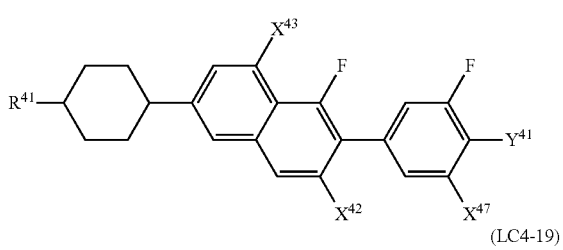
(LC4-19)
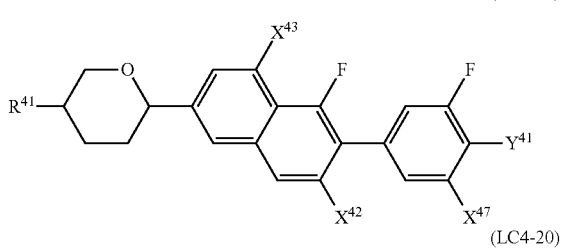
(LC4-20)
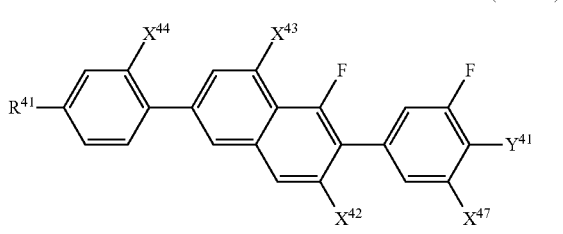
(LC4-21)
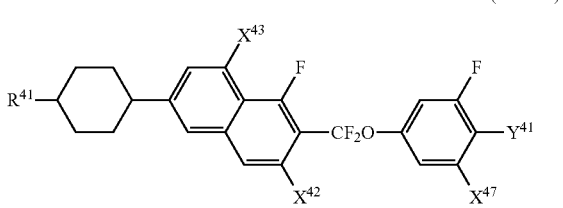

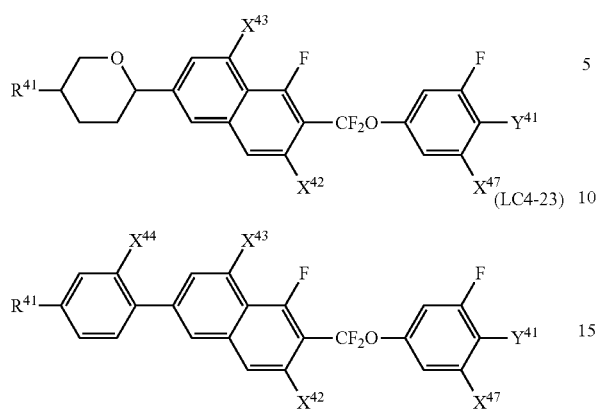

(In the formulae, $X^{44}$, $X^{45}$, $X^{46}$, and $X^{47}$ each independently represent H, Cl, F, $CF_3$, or $OCF_3$, and $X^{42}$, $X^{43}$, $R^{41}$, and $Y^{41}$ are the same as those in general formula (LC4).)

Among these, the group of compounds represented by general formula (LC4-1) to general formula (LC4-3), general formula (LC4-6), general formula (LC4-9), general formula (LC4-10), and general formula (LC4-12) to general formula (LC4-17) is preferably used in combination with the essential component of the present invention represented by general formula (LC0). Of these, one or more compounds selected from the group of compounds represented by general formula (LC4-9) to general formula (LC4-11) and general formula (LC4-15) to general formula (LC4-17) with $X^{44}$ and/or $X^{45}$ representing F are more preferably contained.

The compounds represented by general formula (LC5) are more preferably compounds represented by general formula (LC5-1) to general formula (LC5-26) below:

[Chem. 16]

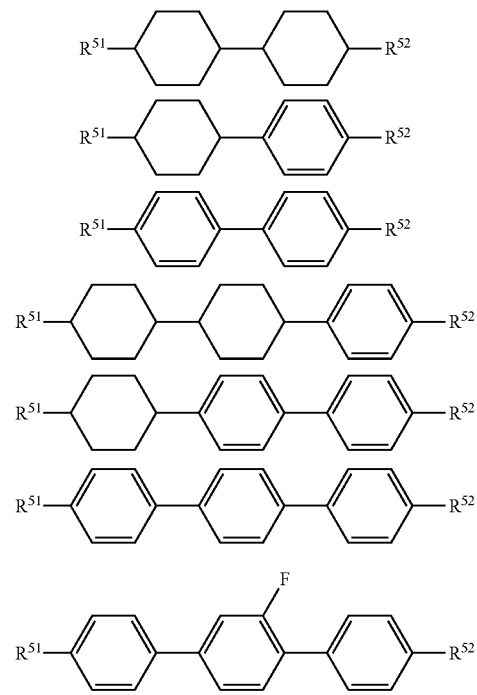

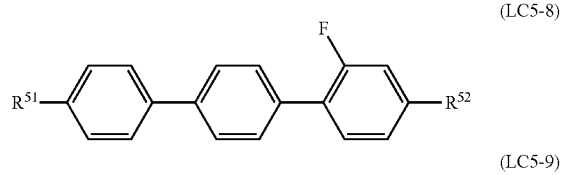

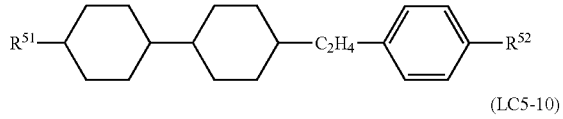

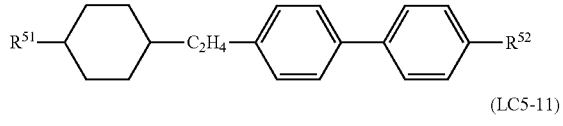

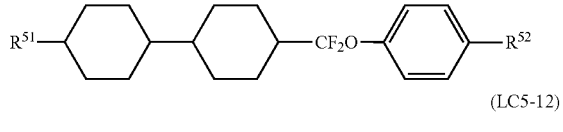

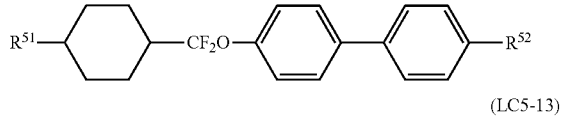

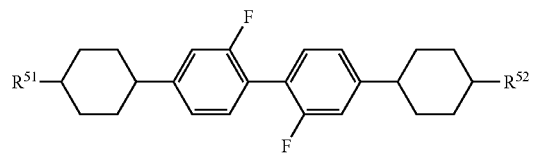

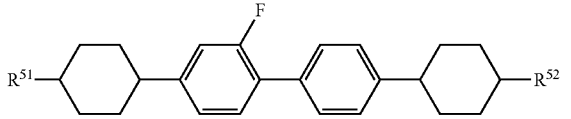

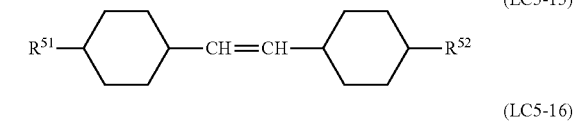

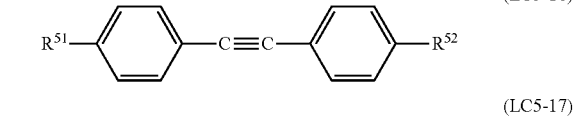

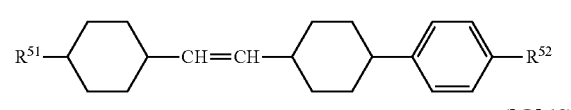

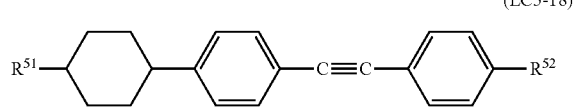

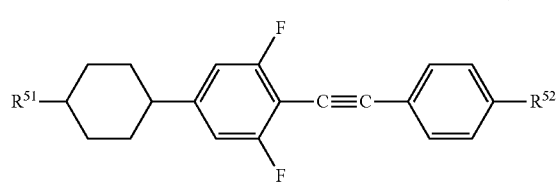

-continued

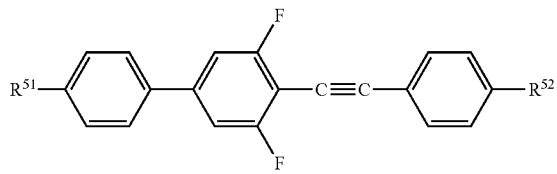
(LC5-20)

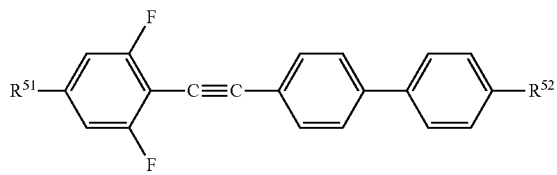
(LC5-21)

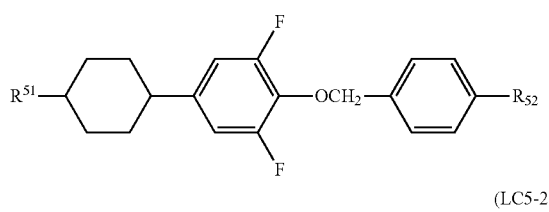
(LC5-22)

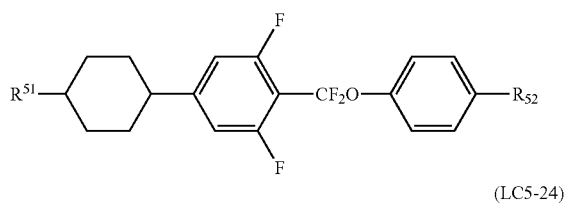
(LC5-23)

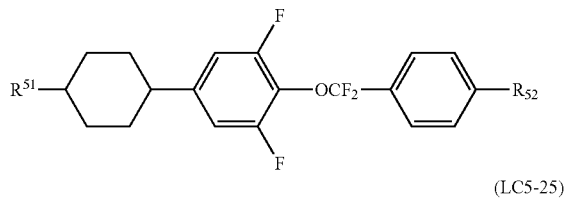
(LC5-24)

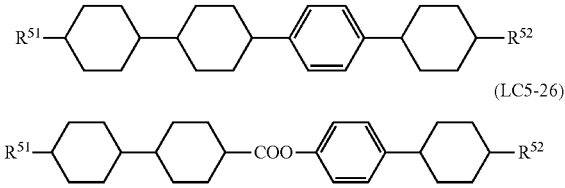
(LC5-25)

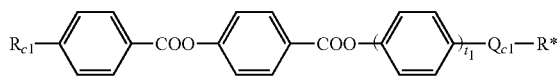
(LC5-26)

(In the formulae, $R^{51}$ and $R^{52}$ are the same as those in general formula (LC5).) Among these, the group of compounds represented by general formula (LC5-1) to general formula (LC5-8), general formula (LC5-14), general formula (LC5-16), and general formula (LC5-18) to general formula (LC5-26) is particularly preferably used in combination with the essential component of the present invention represented by general formula (LC0). At least one of $R^{51}$ and $R^{52}$ in general formula (LC5-1) and general formula (LC5-4) preferably represents an alkenyl group and more preferably represents any one of alkenyl groups represented by formula (R1) to formula (R5) below:

[Chem. 17]

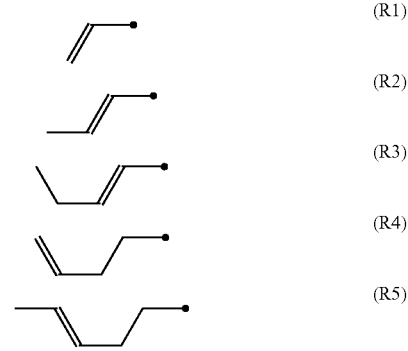

(R1)
(R2)
(R3)
(R4)
(R5)

It is preferable to contain one or more compounds represented by general formula (LC5) and the content thereof is preferably 30 to 70% by mass and more preferably 20% by mass to 70% by mass.

The liquid crystal composition of the present invention contains a compound represented by general formula (LC0) and a compound selected from the group of compounds represented by general formula (LC1) to general formula (LC5). The content of the compound represented by general formula (LC0) is preferably in the range of 5 to 50% by mass and more preferably in the range of 10 to 40% by mass.

The liquid crystal composition of the present invention preferably has a viscosity η of 20 mPa·s or less at 20° C.

The liquid crystal composition of the present invention may contain one or more optically active compounds. The optical active compound may be any compound that can twist and align liquid crystal molecules. Since twisting normally changes depending on temperature, plural optically active compounds may be used to obtain a desired temperature dependence. In order not to adversely affect the nematic liquid crystal phase temperature range, viscosity, and the like, it is preferable to select and use optically active compounds that have a powerful twisting effect. Examples of such optically active compounds to be contained include liquid crystals such as cholesteric nonanoate and compounds represented by general formula (Ch-1) to general formula (Ch-6) below:

[Chem. 18]

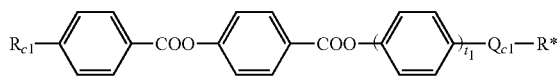
(Ch-1)

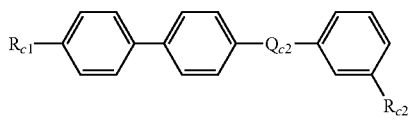
(Ch-2)

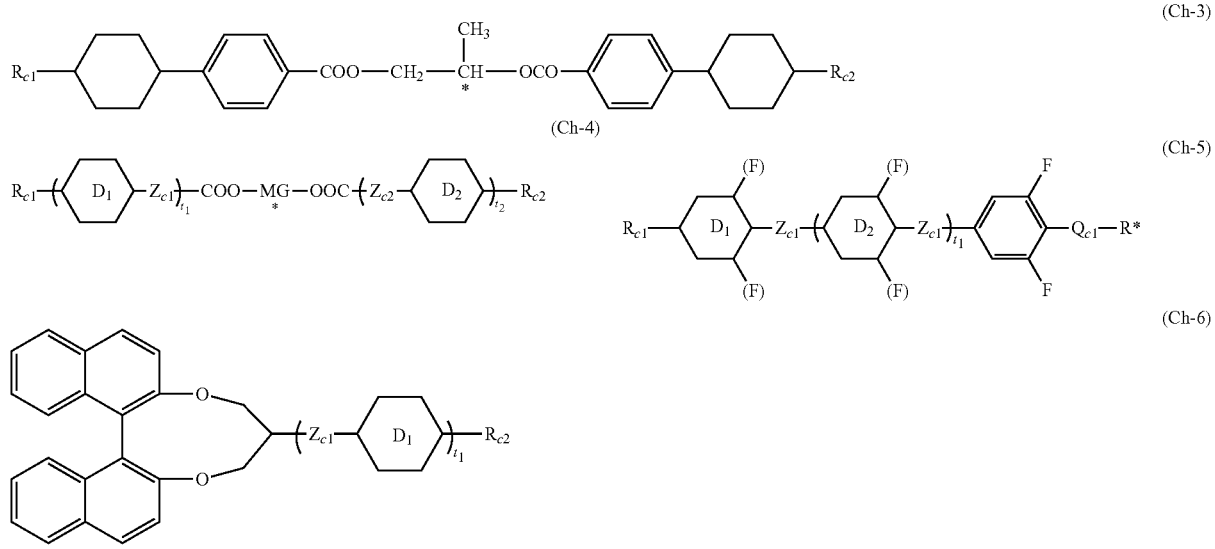

(Ch-3)

(Ch-4)

(Ch-5)

(Ch-6)

(In the formulae, $R_{c1}$, $R_{c2}$, and R* each independently represent an alkyl group having 1 to 15 carbon atoms where one or more —$CH_2$— in the alkyl group may each be substituted with —O—, —CH=CH—, —CO—, —OCO—, —COO—, —C≡C—, —$CF_2O$—, or —$OCF_2$— so long as oxygen atoms are not directly adjacent to each other and one or more hydrogen atoms in the alkyl group may each be substituted with a halogen; R includes at least one optically active branched chain group or halogen substituent; $Z_{c1}$ and $Z_{c2}$ each independently represent a single bond, —CH=CH—, —C≡C—, —$CH_2CH_2$—, —$(CH_2)_4$—, —COO—, —OCO—, —$OCH_2$—, —$CH_2O$—, —$OCF_2$—, or —$CF_2O$—; $D_1$ and $D_2$ each independently represent a cyclohexane ring or a benzene ring, one or more —$CH_2$— in the cyclohexane ring may each be substituted with —O— so long as oxygen atoms are not directly adjacent to each other, one or more —$CH_2CH_2$— in the ring may each be substituted with —CH=CH—, —$CF_2O$—, or —$OCF_2$—, one or more —CH= in the benzene ring may each be substituted with —N= so long as nitrogen atoms are not directly adjacent to each other, and one or more hydrogen atoms in the ring may each be substituted with F, Cl, or $CH_3$; $t_1$ and $t_2$ each represent 0, 1, 2, or 3; and MG*, $Q_{c1}$, and $Q_{c2}$, represent the following structures:

[Chem. 19]

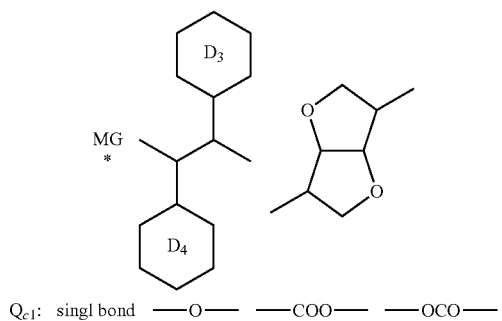

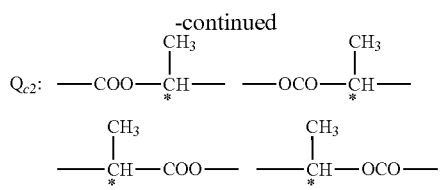

(In the formulae, $D_3$ and $D_4$ each represent a cyclohexane ring or a benzene ring, one or more —$CH_2$— in the cyclohexane ring or the benzene ring may each be substituted with —O— so long as oxygen atoms are not directly adjacent to each other, one or more —$CH_2CH_2$— in the ring may each be substituted with —CH=CH—, —$CF_2O$—, or —$OCF_2$—, one or more —CH= in the benzene ring may each be substituted with —N= so long as nitrogen atoms are not directly adjacent to each other, and one or more hydrogen atoms in the ring may be substituted with F, Cl, or $CH_3$.)

The liquid crystal composition of the present invention may contain one or more polymerizable compounds and the polymerizable compounds are preferably discotic liquid crystal compounds which have a benzene derivative, a triphenylene derivative, a truxene derivative, a phthalocyanine derivative, or a cyclohexane derivative as a core at the molecular center and linear alkyl groups, linear alkoxy groups, or substituted benzoyloxy groups as side chains radially substituting the core.

To be specific, the polymerizable compounds are preferably compounds represented by general formula (PC):

[Chem. 20]

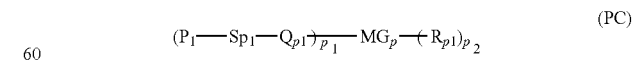

(PC)

(In the formula, $P_1$ represents a polymerizable functional group, $Sp_1$ represents a spacer group having 0 to 20 carbon atoms, $Q_{p1}$ represents a single bond, —O—, —NH—, —NHCOO—, —OCONH—, —CH=CH—, —CO—, —COO—, —OCO—, —OCOO—, —OOCO—, —CH=CH—, —CH=CH—COO—, —OCO—

CH=CH—, or —C≡C—, $p_1$ and $p_2$ each independently represent 1, 2, or 3, $MG_p$ represents a mesogenic group or a mesogenic supporting group, and $R_{p1}$ represents a halogen atom, a cyano group, or an alkyl group having 1 to 25 carbon atoms where one or more $CH_2$ groups in the alkyl group may each be substituted with —O—, —S—, —NH—, —N($CH_3$)—, —CO—, —COO—, —OCO—, —OCOO—, —SCO—, —COS—, or —C≡C-so long as oxygen atoms are not directly adjacent to each other or $R_{p1}$ may represent $P_2$—$Sp_2$-$Q_{p2}$- where $P_2$, $Sp_2$, and $Q_{p2}$ are respectively the same as $P_1$, $Sp_1$, $Q_{p1}$.)

More preferably, the polymerizable compounds are those represented by general formula (PC) with $MG_p$ representing the following structure:

[Chem. 21]

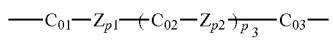

(In the formula, $C_{01}$ to $C_{03}$ each independently represent a 1,4-phenylene group, a 1,4-cyclohexylene group, a 1,4-cyclohexenyl group, a tetrahydropyran-2,5-diyl group, a 1,3-dioxane-2,5-diyl group, a tetrahydrothiopyran-2,5-diyl group, a 1,4-bicyclo(2,2,2)octylene group, a decahydronaphthalene-2,6-diyl group, a pyridine-2,5-diyl group, a pyrimidine-2,5-diyl group, a pyradine-2,5-diyl group, a 1,2,3,4-tetrahydronaphthalene-2,6-diyl group, a 2,6-naphthylene group, a phenanthrene-2,7-diyl group, a 9,10-dihydrophenanthrene-2,7-diyl group, a 1,2,3,4,4a,9,10a-octahydrophenanthrene-2,7-diyl group, or a fluorene-2,7-diyl group; the 1,4-phenylene group, the 1,2,3,4-tetrahydronaphthalene-2,6-diyl group, the 2,6-naphthylene group, the phenanthrene-2,7-diyl group, the 9,10-dihydrophenanthrene-2,7-diyl group, the 1,2,3,4,4a,9,10a-octahydrophenanthrene-2,7-diyl group, and the fluorene-2,7-diyl group may each have, as a substituent, one or more selected from F, Cl, $CF_3$, $OCF_3$, a cyano group, an alkyl group having 1 to 8 carbon atoms, an alkoxy group, an alkanoyl group, an alkanoyloxy group, an alkenyl group having 2 to 8 carbon atoms, an alkenyloxy group, an alkenoyl group, and an alkenoyloxy group; $Z_{p1}$ and $Z_{p2}$ each independently represent —COO—, —OCO—, —$CH_2CH_2$—, —$OCH_2$—, —$CH_2O$—, —CH=CH—, —C≡C—, —CH=CHCOO—, —OCOCH=CH—, —$CH_2CH_2COO$—, —$CH_2CH_2OCO$—, —$COOCH_2CH_2$—, —$OCOCH_2CH_2$—, —CONH—, —NHCO—, or a single bond; and $p_3$ represents 0, 1, or 2).

In the case where $Sp_1$ and $Sp_2$ each independently represent an alkylene group, the alkylene group may be substituted with one or more halogen atoms or CN and one or more $CH_2$ groups present in this group may each be substituted with —O—, —S—, —NH—, —N($CH_3$)—, —CO—, —COO—, —OCO—, —OCOO—, —SCO—, —COS—, or —C≡C— so long as oxygen atoms are not directly adjacent to each other. $P_1$ and $P_2$ preferably each independently represent a group selected from those represented by general formulae below:

[Chem. 22]

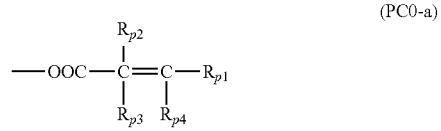 (PC0-a)

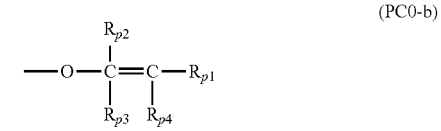 (PC0-b)

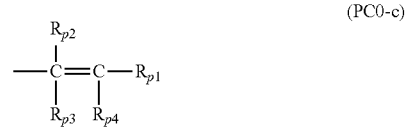 (PC0-c)

 (PC0-d)

(In the formulae, $R_{p2}$ to $R_{p6}$ each independently represent a hydrogen atom, a halogen atom, or an alkyl group having 1 to 5 carbon atoms.)

To be more specific, the polymerizable compounds represented by general formula (PC) are preferably polymerizable compounds represented by general formula (PC0-1) to general formula (PC0-6) below:

[Chem. 23]

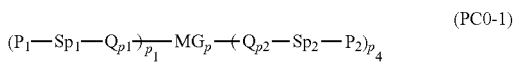 (PC0-1)

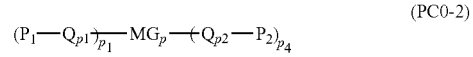 (PC0-2)

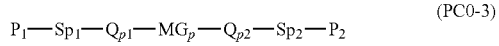 (PC0-3)

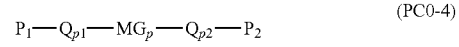 (PC0-4)

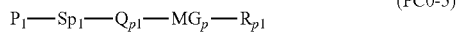 (PC0-5)

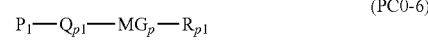 (PC0-6)

(In the formula, $p_4$ each independently represent 1, 2, or 3.) The polymerizable compounds represented by general formula (PC0) are more preferably polymerizable compounds represented by more specific formulae, namely, general formula (PC1-1) to general formula (PC1-9) below:

[Chem. 24]

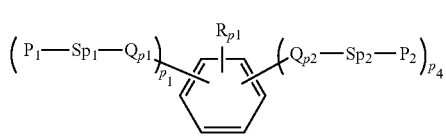 (PC1-1)

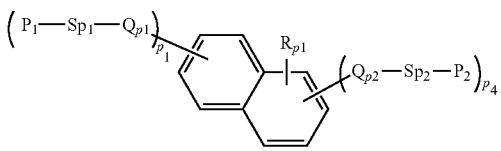 (PC1-2)

-continued (PC1-3)
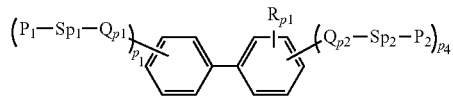

(PC1-4)
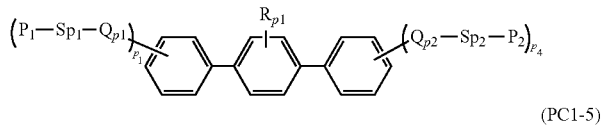

(PC1-5)
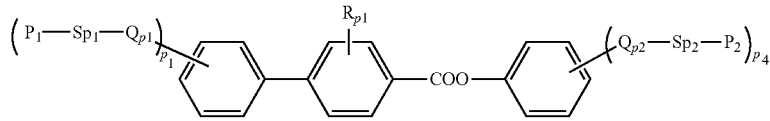

(PC1-6)
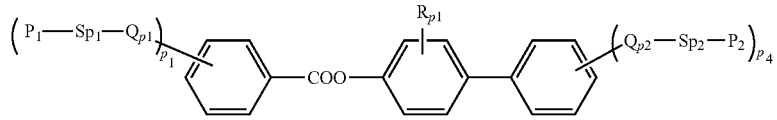

(PC1-7)
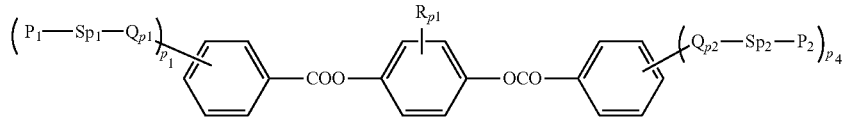

(PC1-8)
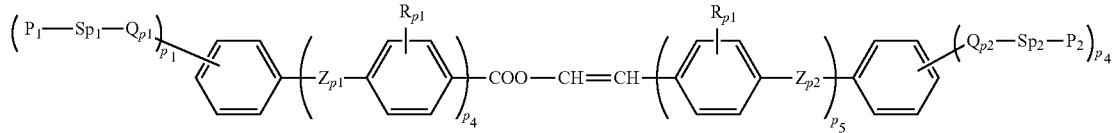

(PC1-9)
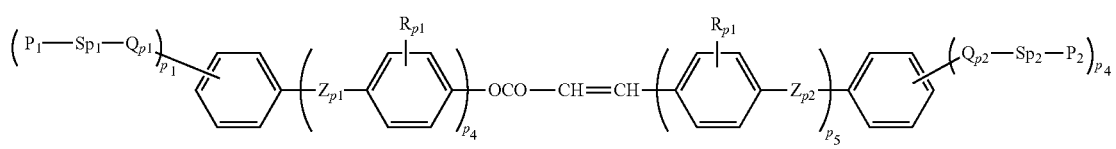

(In the formulae, $p_5$ represents 0, 1, 2, 3, or 4.)

More preferable are polymerizable compounds represented by general formula (PC) to general formula (PC1-9) with $Sp_1$, $Sp_2$, $Q_{p1}$, and $Q_{p2}$ all representing single bonds, polymerizable compounds with $P_1$ and $P_2$ representing a group represented by formula (PC0-a), an acrylate, and/or a methacrylate, polymerizable compounds represented by general formula (PC0-1) and general formula (PC0-2) with $p_1$ and $p_4$ satisfying $p_1+p_4=1$ to 6, and polymerizable compounds represented by general formula (PC1-1) and general formula (PC1-9) with $R_{p1}$ representing F, $CF_3$, $OCF_3$, $CH_3$, or $OCH_3$, where the number of substituents $R_{p1}$ is 1, 2, 3, or 4.

Also preferable is a discotic liquid crystal compound represented by general formula (PC) with $MG_p$ representing a group represented by general formula (PC1)-9.

[Chem. 25]

(PC1)-9
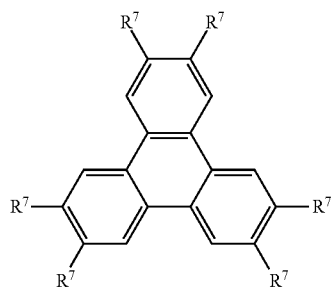

-continued (PC1-e)
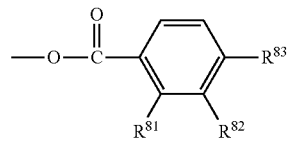

(In the formulae, $R_7$ each independently represent $P_1$-$Sp_1$-$Q_{p1}$ or a substituent represented by general formula (PC1-e), $R_{81}$ and $R_{82}$ each independently represent a hydrogen atom, a halogen atom, or a methyl group, $R_{83}$ represents an alkoxy group having 1 to 20 carbon atoms, and at least one of hydrogen atoms in the alkoxy group is substituted with a substituent represented by any one of general formulae (PC0-a) to (PC0-d) above.) The amount of the polymerizable compounds used is preferably 0.05 to 2.0% by mass.

The liquid crystal composition of the present invention containing a polymerizable compound is used to manufacture a liquid crystal composition through polymerizing the polymerizable compound. During this process, the amount of the unpolymerized components is preferably decreased to a desired level or less. A liquid crystal composition of the present invention suited for this use preferably contains a compound having a biphenyl group or a terphenyl group as a partial structure in general formula (LC0). More specifically, it is preferable to use 0.1 to 40% by mass of at least one selected from the group of compounds represented by general formula (LC0-4) to general formula (LC0-6), general formula (LC0-10) to general formula (LC0-16), and general formula (LC0-27) to general formula (LC0-107). The compound is preferably used in combination with a polymerizable compound selected from those represented by general formula (PL1-1) to general formula (PL1-3), general formula (PC1-8), and general formula (PC1-9).

The liquid crystal composition may further contain one or more antioxidants and one or more UV absorbers. The antioxidant is preferably selected from those represented by general formula (E-1) and/or general formula (E-2) below:

[Chem. 26]

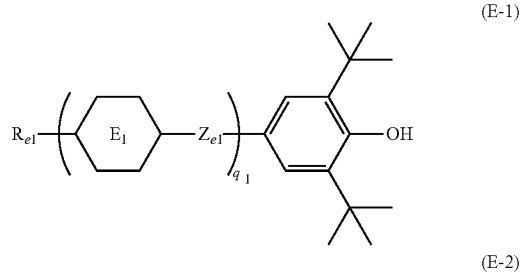

(E-1)

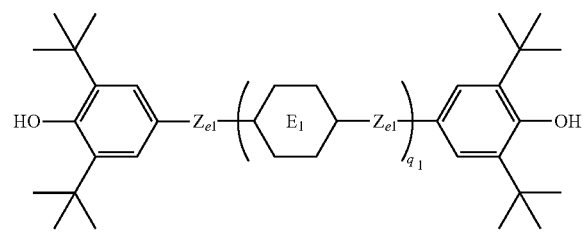

(E-2)

(In the formulae, $R_{e1}$ represents an alkyl group having 1 to 15 carbon atoms, one or more —$CH_2$— in the alkyl group may each be substituted with —O—, —CH=CH—, —CO—, —OCO—, —COO—, —C≡C—, —$CF_2O$—, or —$OCF_2$— so long as oxygen atoms are not directly adjacent to each other, and one or more hydrogen atoms in the alkyl group may each be substituted with a halogen; $Z_{e1}$ and $Z_{e2}$ each independently represent a single bond, —CH=CH—, —C≡C—, —$CH_2CH_2$—, —$(CH_2)_4$—, —COO—, —OCO—, —$OCH_2$—, —$CH_2O$—, —$OCF_2$—, or —$CF_2O$—; and $E_1$ represents a cyclohexane ring or a benzene ring, one or more —$CH_2$— in the cyclohexane ring may each be substituted with —O— so long as oxygen atoms are not directly adjacent to each other, one or more —$CH_2CH_2$— in the ring may each be substituted with —CH=CH—, —$CF_2O$—, or —$OCF_2$—, one or more —CH= in the benzene ring may each be substituted with —N= so long as nitrogen atoms are not directly adjacent to each other, one or more hydrogen atoms in the ring may each be substituted with F, Cl, or $CH_3$, and $q_1$ represents 0, 1, 2, or 3.)

The liquid crystal composition according to the present invention can be used in liquid crystal display devices, in particular, active matrix driving liquid crystal display devices of, for example, TN mode, OCB mode, ECB mode, IPS (including FFS electrodes) mode, or VA-IPS mode (including FFS electrodes). Here, the VA-IPS mode refers to a driving mode in which a liquid crystal material having a positive dielectric anisotropy (Δ∈>0) is vertically aligned with respect to the substrate surface in the absence of applied voltage and liquid crystal molecules are driven by using pixel electrodes and a common electrode arranged on the same substrate surface. Since liquid crystal molecules align in a direction of the curved electric field generated by the pixel electrodes and the common electrode, it is easy to divide pixels into sub-areas to form a multi-domain structure and enhance response. Such a system is referred to as EOC, VA-IPS, etc., according to Non-Patent Literatures Proc. 13th IDW, 97 (1997), Proc. 13th IDW, 175 (1997), SID Sym. Digest, 319 (1998), SID Sym. Digest, 838 (1998), SID Sym. Digest, 1085 (1998), SID Sym. Digest, 334 (2000), and Eurodisplay Proc., 142 (2009). In the present invention, the name "VA-IPS" is used.

In general, the threshold voltage (Vc) of the Freedericksz transition for TN and ECB mode is determined by the following expression:

$$Vc = \frac{\pi d_{cell}}{d_{cell} + <r_1>}\sqrt{\frac{K11}{\Delta\varepsilon}} \quad \text{[Math. 1]}$$

Vc for STN mode is determined by the following expression:

$$Vc = \frac{\pi d_{gap}}{d_{cell} + <r_2>}\sqrt{\frac{K22}{\Delta\varepsilon}} \quad \text{[Math. 2]}$$

Vc for VA mode is determined by the following expression:

$$Vc = \frac{\pi d_{cell}}{d_{cell} - <r_3>}\sqrt{\frac{K33}{|\Delta\varepsilon|}} \quad \text{[Math. 3]}$$

(In the expressions, Vc denotes the Freedericksz transition (V), π denotes the circular constant, $d_{cell}$ denotes the gap (μm) between a first substrate and a second substrate, $d_{gap}$ denotes the gap (μm) between the pixel electrodes and the common electrode, $d_{ITO}$ denotes the width (μm) of the pixel electrodes and/or the common electrode, <r1>, <r2>, and <r3> denote the extrapolation length (μm), K11 denotes the splay elastic constant (N), K22 denotes the twist elastic constant (N), K33 denotes the bend elastic constant (N), and Δ∈ denotes the dielectric anisotropy.)

It has been found that the following mathematical expression 4 is applicable to the present invention etc., for VA-IPS mode:

$$Vc \propto \frac{d_{gap} - <r'>}{d_{ITO} + <r>} \frac{\pi d_{cell}}{d_{cell} - <r_3>}\sqrt{\frac{K33}{|\Delta\varepsilon|}} \quad \text{[Math. 4]}$$

(In the expression, Vc denotes the Freedericksz transition (V), π denotes the circular constant, $d_{cell}$ denotes the gap (μm) between a first substrate and a second substrate, $d_{gap}$ denotes the gap (μm) between the pixel electrodes and the common electrode, $d_{ITO}$ denotes the width (μm) of the pixel electrodes and/or the common electrode, <r>, <r'>, and <r3> denote the extrapolation length (μm), K33 denotes the bend elastic constant (N), and Δ∈ denotes the dielectric anisotropy.) Mathematical expression 4 shows that the cell structure may be designed to decrease $d_{gap}$ as much as possible and increase $d_{ITO}$ as much as possible to achieve low drive voltage and that a liquid crystal composition having ΔЄ with a large absolute value and a low K33 may be selected as the liquid crystal composition to achieve low drive voltage.

The liquid crystal composition of the present invention can be adjusted to exhibit desirable ΔЄ, K11, K33, etc. The product (Δn·d) of the refractive index anisotropy (Δn) of the liquid crystal composition and the gap (d) between the first substrate and the second substrate of a display device is strongly related to viewing angle characteristics and response speed. Accordingly, the gap (d) tends to be as small as 3 to 4 μm. The product (Δn·d) is particularly preferably 0.31 to 0.33 for the TN, ECB, and IPS (liquid crystal aligns substantially horizontal to the substrate surface in the absence of applied voltage) modes. For the VA-IPS mode, the product is preferably 0.20 to 0.59 and more preferably 0.30 to 0.40 if the alignment is vertical with respect to the two substrates. Since the suitable value of the product (Δn·d) differs depending on the mode of the display device, a liquid crystal composition capable of exhibiting a refractive index anisotropy (Δn) in various different ranges, such as 0.070 to 0.110, 0.100 to 0.140, or 0.130 to 0.180 is required. In order to obtain a small or relatively small refractive index anisotropy (Δn) from the liquid crystal composition of the present invention, it is preferable to use 0.1 to 80% by mass of one or more compounds selected from the group consisting of compounds represented by general formula (LC0-1) to general formula (LC0-3), general formula (LC0-7) to general formula (LC0-9), and general formula (LC0-20) to general formula (LC0-30). In order to obtain a large or relatively large refractive index anisotropy (Δn), it is preferable to use 0.1 to 60% by mass of one or more compounds selected from the group consisting of compounds represented by general formula (LC0-4) to general formula (LC0-6), general formula (LC0-10) to general formula (LC0-16), and general formula (LC0-27) to general formula (LC0-107).

For the TN and ECB modes that require the liquid crystal to align substantially horizontal to the substrate surface in the absence of applied voltage, the tilt angle is preferably 0.5 to 7°. For the VA-IP mode that requires the liquid crystal to align substantially perpendicular to the substrate surface in the absence of applied voltage, the tilt angle is preferably 85 to 90°. In order to have the liquid crystal composition aligned in such a manner, alignment films composed of polyimide (PI), polyamide, chalcone, cinnamate, cinnamoyl, or the like may be provided. The alignment films are preferably formed by using an optical alignment technology. A liquid crystal composition of the present invention containing a compound represented by general formula (LC0) having a partial structure in which $X^{01}$ represents F can be easily aligned along the easy axis of the alignment films and the desired tilt angle can be easily formed.

A liquid crystal composition of the present invention containing a compound represented by general formula (PC) as the polymerizable compound can be used to form a polymer-stabilized TN-mode, OCB-mode, ECB-mode, IPS-mode, or VA-IPS mode liquid crystal display device prepared by polymerizing the polymerizable compounds in the liquid crystal composition in the presence or absence of applied voltage.

EXAMPLES

The present invention will now be described in further detail by using Examples which do not limit the scope of the present invention. Note that the "%" for compositions of Examples and Comparative Examples below means "% by mass".

The physical properties of the liquid crystal composition are presented as follows:

$T_{N-I}$: nematic phase-isotropic liquid phase transition temperature (° C.)

T-n: lower limit temperature (° C.) of nematic phase $\in\perp$: dielectric constant in a direction perpendicular to the molecular long axis at 25° C.

ΔЄ: dielectric anisotropy at 25° C.

no: refractive index for ordinary rays at 25° C.

Δn: refractive index anisotropy at 25° C.

Vth: voltage (V) applied to a 6 μm-thick cell at which the transmittance changes by 10% when square waves are applied at a frequency of 1 KHz at 25° C.

Viscosity: bulk viscosity (mPa·s) at 20° C.

$\gamma_1$: rotational viscosity (mPa·s)

Compounds are abbreviated as follows:

TABLE 1

| n (numeral) at terminus | $C_nH_{2n+1}$— |
|---|---|
| -2- | —$CH_2CH_2$— |
| —1O— | —$CH_2O$— |
| —O1— | —$OCH_2$— |
| —V— | —CO— |
| —VO— | —COO— |
| —CFFO— | —$CF_2O$— |
| —F | —F |
| —Cl | —Cl |
| —CN | —C≡N |
| —OCFFF | —$OCF_3$ |
| —CFFF | 0 |
| —OCFF | —$OCHF_2$ |
| —On | —$OC_nH_{2n+1}$ |
| -T- | —C≡C— |
| ndm- | $C_nH_{2n+1}$—HC=CH—$(CH_2)_{m-1}$— |
| -ndm | —$(CH_2)_{n-1}$—HC=CH—$C_mH_{2m+1}$ |
| ndmO— | $C_nH_{2n+1}$—HC=CH—$(CH_2)_{m-1}$—O— |
| —Ondm | —O—$(CH_2)_{n-1}$—HC=CH—$C_mH_{2m+1}$ |

[Chem. 27]

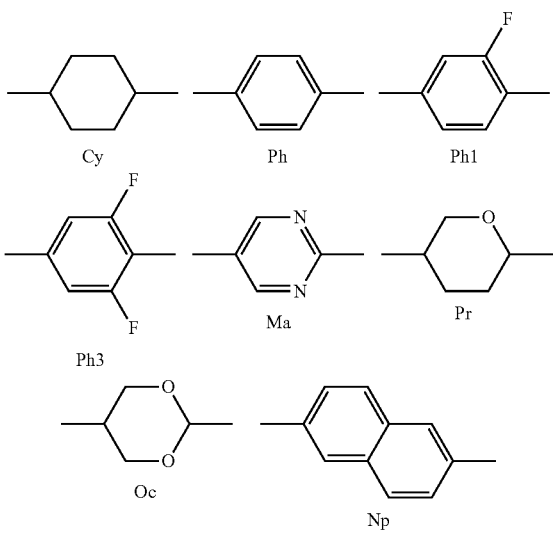

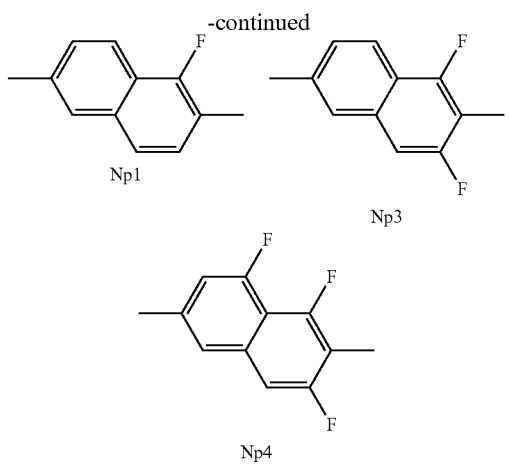

Np1

Np3

Np4

Example 1

A liquid crystal composition prepared and physical properties thereof are shown below:

TABLE 2

| | |
|---|---|
| 1d1-Cy-Cy-3 | 15.0% |
| od1-Cy-Cy-1d1 | 15.0 |
| 3-Cy-Cy-Ph-1 | 8.0 |
| 1-Ph—Ph1—Ph-3d0 | 7.0 |
| 3-Cy-Cy-Ph3—OCFFF | 10.0 |
| 3-Cy-Ph—Ph3—OCFFF | 5.0 |
| 3-Cy-Ph1—Ph3—CFFO—Ph3—F | 10.0 |
| 1d1-Cy-Ph3—O1—Ph3—F | 10.0 |
| 1d1-Cy-Ph3—O1—Ph—OCFFF | 20.0 |
| Tni | 72.4 |
| T-n | −36.0 |
| Vth | 1.64 |
| γ1 | 52.0 |
| ε⊥ | 3.80 |
| Δε | 7.88 |
| no | 1.488 |
| Δn | 0.100 |
| Viscosity | 11.1 |

Comparative Example 2

A liquid crystal composition prepared and physical properties thereof are shown below:

TABLE 3

| | |
|---|---|
| 1d1-Cy-Cy-3 | 15.0% |
| od1-Cy-Cy-1d1 | 15.0 |
| 3-Cy-Cy-Ph-1 | 8.0 |
| 1-Ph—Ph1—Ph-3d0 | 7.0 |
| 3-Cy-Cy-Ph3—OCFFF | 10.0 |
| 3-Cy-Ph—Ph3—OCFFF | 5.0 |
| 3-Cy-Ph1—Ph3—CFFO—Ph3—F | 10.0 |
| 1d1-Cy-Ph—O1—Ph3—F | 10.0 |
| 1d1-Cy-Ph3—1O—Ph—OCFFF | 20.0 |
| Tni | 64.4 |
| T-n | −32.0 |
| Vth | 1.66 |
| γ1 | 97.0 |
| ε⊥ | 3.63 |
| Δε | 7.57 |
| no | 1.488 |
| Δn | 0.100 |
| Viscosity | 21.0 |

This liquid crystal composition does not contain a compound represented by general formula (LC0) having a -Ph3-OCH$_2$— partial structure disclosed in this application. Although Example 1 has a larger dielectric anisotropy (Δ∈) and a high nematic phase-isotropic liquid phase transition temperature (T$_{ni}$), Example 1 has viscosity substantially lower than that of Comparative Example 1, and small γ$_1$. This shows that the combination of the present invention has outstanding benefits.

Example 3

A liquid crystal composition prepared and physical properties thereof are shown below:

TABLE 4

| Compound | Example 2 |
|---|---|
| 0d1-Cy-Cy-3 | 5.0% |
| 1d1-Cy-Cy-2 | 10.0 |
| 1d1-Cy-Cy-3 | 10.0 |
| 3-Cy-Cy-2 | 5.0 |
| 3-Cy-Cy-Ph3—OCFFF | 5.0 |
| 3-Cy-Ph—Ph3—OCFFF | 5.0 |
| 3-Cy-Cy-CFFO—Ph3—F | 5.0 |
| 3-Cy-Ph1—Ph3—CFFO—Ph3—F | 5.0 |
| 1d1-Cy-Ph3—O1—Ph3—F | 5.0 |
| 1d1-Cy-Ph3—O1—Ph—OCFFF | 5.0 |
| 0d1-Cy-Ph3—O1—Ph3—F | 5.0 |
| 0d1-Cy-Ph3—O1—Ph—OCFFF | 5.0 |
| 1d1-Cy-Cy-Ph3—O1—Ph3—F | 5.0 |
| 0d1-Cy-Ph1—Ph3—O1—Ph3—F | 5.0 |
| 0d1-Cy-Ph1—Ph3—O1—Ph—OCFFF | 5.0 |
| 0d1-Cy-Ph1—Ph3—O1—Ph3—OCFFF | 5.0 |
| 3-Cy-Ph3—O1—Ph—OCFFF | 5.0 |
| 3-Cy-Cy-Ph3—O1Ph3—F | 5.0 |
| Tni | 71.0 |
| T-n | −38.0 |
| Vth | 1.42 |
| γ1 | 67.0 |
| ε⊥ | 4.08 |
| Δε | 9.82 |
| no | 1.486 |
| Δn | 0.089 |
| Viscosity | 12.1 |

Example 4

A liquid crystal composition prepared and physical properties thereof are shown below:

TABLE 5

| | |
|---|---|
| 0d1-Cy-Cy-3 | 15.0% |
| 1d1-Cy-Cy-2 | 15.0 |
| 1d1-Cy-Cy-3 | 10.0 |
| od1-Cy-Cy-1d1 | 12.0 |
| 3-Cy-Cy-2 | 3.0 |
| 1d1-Cy-Ph3—O1—Ph—OCFFF | 5.0 |
| 1d1-Cy-Cy-Ph3—O1—Ph3—F | 8.0 |
| 0d1-Cy-Ph1—Ph3—O1—Ph—OCFFF | 8.0 |
| 0d1-Cy-Ph1—Ph3—O1—Ph3—OCFFF | 7.0 |
| 3-Cy-Ph3—O1—Ph—OCFFF | 10.0 |
| 3-Cy-Cy-Ph3—O1Ph3—F | 7.0 |
| Tni | 73.4 |
| T-n | −32.0 |
| Vth | 1.89 |
| γ1 | 43.0 |
| ε⊥ | 3.41 |
| Δε | 5.74 |
| no | 1.484 |
| Δn | 0.075 |
| Viscosity | 8.5 |

Example 4

A liquid crystal composition prepared and physical properties thereof are shown below:

TABLE 6

| | |
|---|---|
| 0d1-Cy-Cy-3 | 15.0% |
| 1d1-Cy-Cy-2 | 15.0 |
| 1d1-Cy-Cy-3 | 10.0 |
| od1-Cy-Cy-1d1 | 10.0 |
| 3-Cy-Cy-2 | 5.0 |
| 3-Cy-Cy-Ph-1 | 5.0 |
| 1d1-Cy-Ph3—O1—Ph3—F | 5.0 |
| 1d1-Cy-Cy-Ph3—O1—Ph3—F | 10.0 |
| 0d1-Cy-Ph1—Ph3—O1—Ph—OCFFF | 10.0 |
| 3-Cy-Ph3—O1—Ph—OCFFF | 5.0 |
| 3-Cy-Cy-Ph3—O1Ph3—F | 10.0 |
| Tni | 80.8 |
| T-n | −31.0 |
| Vth | 2.02 |
| γ1 | 53.0 |
| ε⊥ | 3.34 |
| Δε | 5.06 |
| no | 1.482 |
| Δn | 0.069 |
| Viscosity | 9.5 |

Example 5

A liquid crystal composition prepared and physical properties thereof are shown below:

TABLE 7

| | |
|---|---|
| 0d1-Cy-Cy-3 | 10.0% |
| 1d1-Cy-Cy-2 | 15.0 |
| 0d3-Cy-Cy-3 | 10.0 |
| 2-Ph—Ph1—Ph-3d0 | 5.0 |
| 3-Ph—Ph1—Ph3—OCFFF | 5.0 |
| 3-Ph—Ph1—Ph3—CFFO—Ph3—F | 5.0 |
| 3-Ph—Ph3—O1—Ph—OCFFF | 10.0 |
| 3-Cy-Ph—Ph3—O1—Ph—OCFFF | 10.0 |
| 0d3-Ph—Ph3—O1—Ph—OCFFF | 10.0 |
| 0d1-Cy-Ph1—Ph3—O1—Ph3—F | 10.0 |
| 0d3-Ph—Ph1—Ph3—O1—Ph3—F | 10.0 |
| Tni | 72.7 |
| T-n | −33.0 |
| Vth | 1.42 |
| γ1 | 68.0 |
| ε⊥ | 3.52 |
| Δε | 10.02 |
| no | 1.496 |
| Δn | 0.128 |
| Viscosity | 12.9 |

Example 6

A liquid crystal composition prepared and physical properties thereof are shown below:

TABLE 8

| | |
|---|---|
| 1d1-Cy-Cy-2 | 15.0% |
| 0d3-Cy-Cy-3 | 10.0 |
| 3-Cy-Ph—O2 | 5.0 |
| 5-Ph—Ph-1 | 5.0 |
| 2-Ph—Ph1—Ph-3d0 | 5.0 |
| 3-Ph—Ph1—Ph3—OCFFF | 5.0 |
| 3-Ph—Ph1—Ph3—CFFO—Ph3—F | 10.0 |
| 3-Ph—Ph3—O1—Ph—OCFFF | 5.0 |
| 3-Cy-Ph—Ph3—O1—Ph—OCFFF | 10.0 |
| 0d3-Ph—Ph3—O1—Ph—OCFFF | 10.0 |
| 0d1-Cy-Ph1—Ph3—O1—Ph3—F | 10.0 |

TABLE 8-continued

| | |
|---|---|
| 0d3-Ph—Ph1—Ph3—O1—Ph3—F | 10.0 |
| Tni | 72.9 |
| T-n | −33.0 |
| Vth | 1.38 |
| γ1 | 75.0 |
| ε⊥ | 3.64 |
| Δε | 11.15 |
| no | 1.498 |
| Δn | 0.139 |
| Viscosity | 14.6 |

Example 7

A liquid crystal composition prepared and physical properties thereof are shown below:

TABLE 9

| | |
|---|---|
| 0d1-Cy-Cy-3 | 10.0% |
| 1d1-Cy-Cy-2 | 10.0 |
| 0d3-Cy-Cy-3 | 15.0 |
| 3-Ph—Ph1—Ph3—OCFFF | 5.0 |
| 3-Ph—Ph1—Ph3—CFFO—Ph3—F | 10.0 |
| 3-Ph—Ph3—O1—Ph3—F | 5.0 |
| 3-Cy-Ph—Ph3—O1—Ph—OCFFF | 15.0 |
| 3-Cy-Ph3—O1—Ph3—Ph1—F | 5.0 |
| 3-Ph3—O1-Cy-Ph3—Ph1—F | 5.0 |
| 1d1-Cy-Ph3—O1—Ph3—F | 5.0 |
| 1d1-Cy-Ph3—O1—Ph3—OCFFF | 5.0 |
| 0d1-Cy-Ph1—Ph3—O1—Ph3—F | 5.0 |
| 0d3-Ph—Ph1—Ph3—O1—Ph3—F | 5.0 |
| Tni | 72.4 |
| T-n | −36.0 |
| Vth | 1.23 |
| γ1 | 79.0 |
| ε⊥ | 4.29 |
| Δε | 12.98 |
| no | 1.490 |
| Δn | 0.110 |
| Viscosity | 16.7 |

Example 8

A liquid crystal composition prepared and physical properties thereof are shown below:

TABLE 10

| | |
|---|---|
| 0d1-Cy-Cy-3 | 10.0% |
| 1d1-Cy-Cy-2 | 10.0 |
| 0d3-Cy-Cy-3 | 15.0 |
| 3-Cy-Cy-2 | 3.0 |
| 3-Cy-Cy-O1 | 2.0 |
| 0d1-Cy-Cy-Ph-1 | 8.0 |
| 2-Cy-Cy-Ph-1 | 7.0 |
| 3-Cy-Ph—Ph3—F | 5.0 |
| 3-Ph—Ph1—Ph3—CFFO—Ph3—F | 5.0 |
| 3-Ph—Ph3—O1—Ph3—F | 5.0 |
| 3-Ph—Ph3—O1—Ph—OCFFF | 3.0 |
| 3-Cy-Ph—Ph3—O1—Ph—OCFFF | 15.0 |
| 0d1-Cy-Ph3—O1—Ph3—F | 2.0 |
| 1d1-Cy-Ph3—O1—Ph3—F | 5.0 |
| 0d3-Ph—Ph3—O1—Ph—OCFFF | 5.0 |
| Tni | 70.8 |
| T-n | −38.0 |
| Vth | 1.77 |
| γ1 | 57.0 |
| ε⊥ | 3.50 |
| Δε | 6.87 |
| no | 1.488 |
| Δn | 0.094 |
| Viscosity | 11.4 |

Example 9

A liquid crystal composition prepared and physical properties thereof are shown below:

TABLE 11

| | |
|---|---|
| 0d1-Cy-Cy-3 | 10.0% |
| 1d1-Cy-Cy-2 | 10.0 |
| 0d3-Cy-Cy-3 | 10.0 |
| 3-Cy-Cy-2 | 3.0 |
| 3-Cy-Cy-O1 | 2.0 |
| 3-Cy-Ph—O1 | 2.0 |
| 3-Cy-Ph—O2 | 3.0 |
| 5-Ph—Ph-1 | 2.0 |
| 0d3-Ph—Ph-3d0 | 3.0 |
| 0d1-Cy-Cy-Ph-1 | 5.0 |
| 2-Cy-Cy-Ph-1 | 5.0 |
| 2-Ph—Ph1—Ph-3d0 | 5.0 |
| 3-Cy-Ph—Ph3—F | 2.0 |
| 3-Ph—Ph1—Ph3—OCFFF | 3.0 |
| 3-Ph—Ph1—Ph3—CFFO—Ph3—F | 5.0 |
| 3-Ph—Ph3—O1—Ph—OCFFF | 5.0 |
| 3-Cy-Ph—Ph3—O1—Ph—OCFFF | 5.0 |
| 3-Ph3—O1-Cy-Ph3—Ph1—F | 5.0 |
| 0d1-Cy-Ph1—Ph3—O1—Ph3—F | 7.0 |
| 0d3-Ph—Ph1—Ph3—O1—Ph3—F | 8.0 |
| Tni | 74.5 |
| T-n | −39.0 |
| Vth | 1.61 |
| γ1 | 73.0 |
| ε⊥ | 3.50 |
| Δε | 8.00 |
| no | 1.490 |
| Δn | 0.115 |
| Viscosity | 13.6 |

Example 10

A liquid crystal composition prepared and physical properties thereof are shown below:

TABLE 12

| | |
|---|---|
| 0d1-Cy-Cy-3 | 10.0% |
| 1d1-Cy-Cy-2 | 15.0 |
| 0d3-Cy-Cy-3 | 10.0 |
| 3-Cy-Ph—O2 | 2.0 |
| 5-Ph—Ph-1 | 2.0 |
| 2-Cy-Cy-Ph-1 | 7.0 |
| 2-Ph—Ph1—Ph-3d0 | 7.0 |
| 3-Cy-Ph—Ph3—F | 2.0 |
| 3-Ph—Ph1—Ph3—OCFFF | 3.0 |
| 3-Ph—Ph1—Ph3—CFFO—Ph3—F | 5.0 |
| 3-Ph—Ph3—O1—Ph3—F | 2.0 |
| 3-Ph—Ph3—O1—Ph—OCFFF | 2.0 |
| 3-Cy-Ph—Ph3—O1—Ph—OCFFF | 5.0 |
| 3-Cy-Ph3—O1—Ph3—Ph1—F | 5.0 |
| 3-Ph3—O1-Cy-Ph3—Ph1—F | 5.0 |
| 0d1-Cy-Ph3—O1—Ph3—F | 2.0 |
| 1d1-Cy-Ph3—O1—Ph3—F | 2.0 |
| 1d1-Cy-Ph3—O1—Ph3—OCFFF | 2.0 |
| 0d3-Ph—Ph3—O1—Ph—OCFFF | 2.0 |
| 0d1-Cy-Ph1—Ph3—O1—Ph3—F | 5.0 |
| 0d3-Ph—Ph1—Ph3—O1—Ph3—F | 5.0 |
| Tni | 71.1 |
| T-n | −38.0 |
| Vth | 1.53 |
| γ1 | 75.0 |
| ε⊥ | 3.71 |
| Δε | 9.29 |
| no | 1.491 |
| Δn | 0.112 |
| Viscosity | 14.0 |

As described above, the liquid crystal compositions according to Examples 2 to 10 have low viscosity and small $\gamma_1$. This shows that the combination of the present invention has outstanding benefits.

Example 11

A vertical alignment film was formed on a first substrate that had a pair of comb-shaped transparent electrodes. Another vertical alignment film was formed on a second substrate that had no electrode structure. The first substrate and the second substrate were formed into an IPS empty cell having a gap spacing of 4.0 μm. The liquid crystal composition of Example 1 was poured into the empty cell to prepare a liquid crystal display device.

To 99% of the liquid crystal composition of Example 1, 1% of a polymerizable compound represented by formula (PC-1)-3-1 was added and homogeneously dissolved:

[Chem. 28]

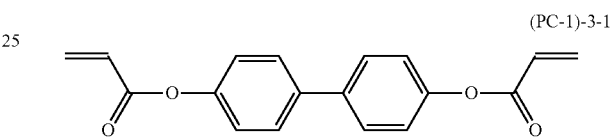

(PC-1)-3-1

As a result, a polymerizable liquid crystal composition CLC-A was obtained. The physical properties of CLC-A were substantially the same as physical properties of the liquid crystal composition of Example 1.

CLC-A was held in the IPS empty cell described above. The liquid crystal cell was then irradiated with ultraviolet light using a high-pressure mercury lamp through a filter that cuts off ultraviolet rays of 300 nm or less while applying 1.8 V square waves at a frequency of 1 KHz. The irradiation was conducted for 600 seconds while adjusting the irradiation intensity at the cell surface to be 20 mW/cm². As a result, a vertical-alignment liquid crystal display device in which a polymerizable compound in the polymerizable liquid crystal composition was polymerized was obtained. This display deice had significantly high response speed compared to the liquid crystal display device formed by using only the liquid crystal composition of Example 1.

The invention claimed is:

1. A liquid crystal composition having a positive dielectric anisotropy and containing one or more compounds selected from compounds represented by general formula (LC0) and one or more compounds selected from a group of compounds represented by general formula (LC1) to general formula (LC5):

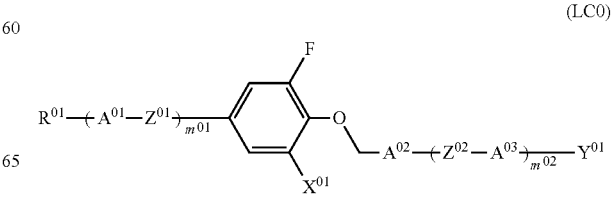

(LC0)

-continued

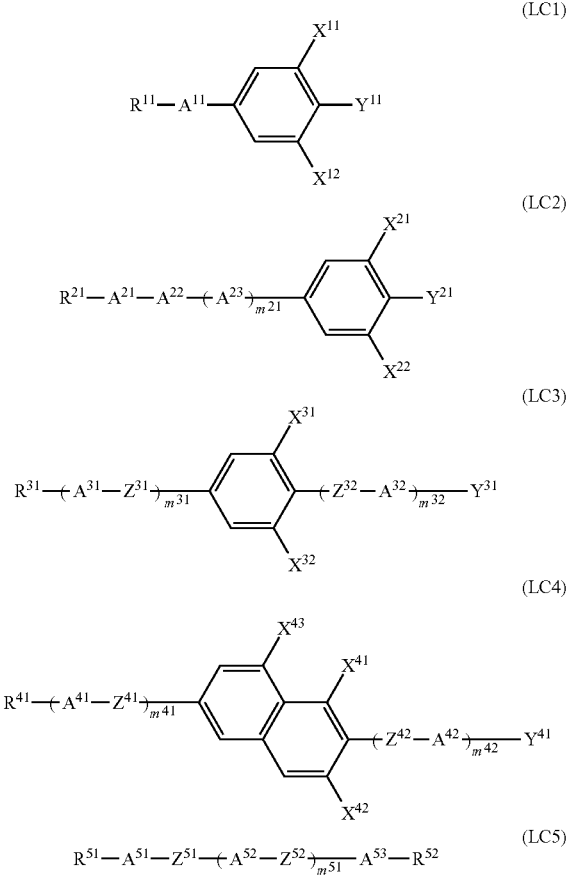

(LC1)
(LC2)
(LC3)
(LC4)
(LC5)

wherein in the formulae, $R^{01}$ represents an alkenyl group having 2 to 5 carbon atoms, $R^{11}$, $R^{21}$, $R^{31}$ and $R^{41}$ each independently represent an alkyl group having 1 to 15 carbon atoms where one or more —$CH_2$— in the alkyl group may each be substituted with —O—, —CH=CH—, —CO—, —OCO—, —COO—, —C≡C—, —$CF_2$O—, or —$OCF_2$— so long as oxygen atoms are not directly adjacent to each other and one or more hydrogen atoms in the alkyl group may each be substituted with a halogen, $R^{51}$ and $R^{52}$ each independently represent an alkyl group having 1 to 15 carbon atoms where one or more —$CH_2$— in the alkyl group may each be substituted with —O—, —CH=CH—, —CO—, —OCO—, —COO—, or —C≡C— so long as oxygen atoms are not directly adjacent to each other and may each represent —$OCF_3$ or —$CF_3$— when $A^{51}$ or $A^{53}$ below represents a cyclohexane ring, $A^{01}$, $A^{02}$, $A^{03}$, $A^{11}$, $A^{21}$, $A^{22}$, $A^{23}$, $A^{31}$, $A^{32}$, $A^{41}$, $A^{42}$ each independently represent any one of the structures below:

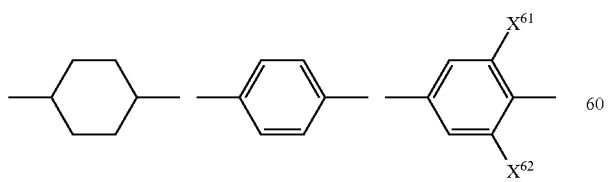

wherein in the structures, one or more —$CH_2$— in the cyclohexane ring may each be substituted with —O— so long as oxygen atoms are not directly adjacent to each other, one or more —CH= in the benzene ring may each be substituted with —N= so long as nitrogen atoms are not directly adjacent to each other, and $X^{61}$ and $X^{62}$ each independently represent —H, —Cl, —F, —$CF_3$, or —$OCF_3$, $A^{51}$ to $A^{53}$ each independently represent any one of the structures below:

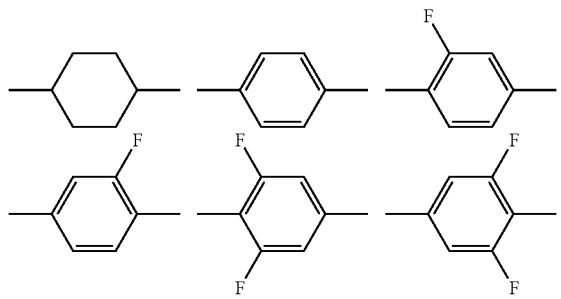

wherein in the formulae, one or more —$CH_2CH_2$— in the cyclohexane ring may each be substituted with —CH=CH—, —$CF_2$O—, or —$OCF_2$—, and one or more —CH= in the benzene ring may each be substituted with —N= so long as nitrogen atoms are not directly adjacent to each other, $X^{01}$ represents a hydrogen atom or a fluorine atom, $X^{11}$, $X^{12}$, $X^{21}$, $X^{22}$, $X^{31}$, $X^{32}$, $X^{41}$, $X^{42}$ and $X^{43}$ each independently represent —H, —Cl, —F, —$CF_3$, or —$OCF_3$, $Y^{01}$, $Y^{11}$, $Y^{21}$, $Y^{31}$, and $Y^{41}$, each represent —Cl, —F, —$OCHF_2$, —$CF_3$, or —$OCF_3$, $Z^{01}$ and $Z^{02}$ each independently represent a single bond, —CH=CH—, —C≡C—, —$CH_2CH_2$—, —$(CH_2)_4$—, —$OCF_2$—, or —$CF_2O$—, $Z^{31}$, $Z^{32}$, $Z^{41}$, $Z^{42}$, $Z^{51}$ and $Z^{52}$, each independently represent a single bond, —CH=CH—, —C≡C—, —$CH_2CH_2$—, —$(CH_2)_4$—, —$OCF_2$—, or —$CF_2O$—, at least one of $Z^{31}$ and $Z^{32}$ that are present represents a group other than a single bond, $Z^{51}$ and $Z^{52}$ each independently represent a single bond, —CH=CH—, —C≡C—, —$CH_2CH_2$—, —$(CH_2)_4$—, —$OCH_2$—, —$CH_2O$—, —$OCF_2$— or —$CF_2O$—, $m^{01}$ and $m^{02}$ represent an integer of 0 to 2, $m^{21}$, $m^{31}$, $m^{32}$, $m^{41}$, $m^{42}$ and $m^{51}$ each independently represent an integer of 0 to 3, $m^{01}+m^{02}$ is 1, or 2, $m^{31}+m^{32}$ and $m^{41}+m^{42}$ are each independently 1, 2, 3, or 4, and when a plurality of $A^{01}$, $A^{03}$, $A^{23}$, $A^{31}$, $A^{32}$, $A^{41}$, $A^{42}$, $A^{52}$, $Z^{01}$, $Z^{02}$, $Z^{31}$, $Z^{32}$, $Z^{41}$, $Z^{42}$, and/or $Z^{52}$ are present, they may be the same or different.

2. The liquid crystal composition according to claim 1, wherein the liquid crystal composition contains 5 to 50% by mass of one or more compounds represented by general formula (LC0) with $R^{01}$ representing one of (R1) to (R5) below:

(R1)

(R2)

(R3)

(R4)

(R5)

(In each formula, the black dot represents a bonding point to a ring).

3. The liquid crystal composition according to claim 1, wherein $X^{01}$ in general formula (LC0) represents F.

4. The liquid crystal composition according to claim 1, wherein the liquid crystal composition contains one or more compounds selected from the group consisting of compounds represented by general formula (LC2-1) to general formula (LC2-14) as the compound represented by general formula (LC2):

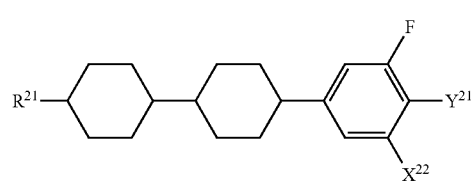
(LC2-1)

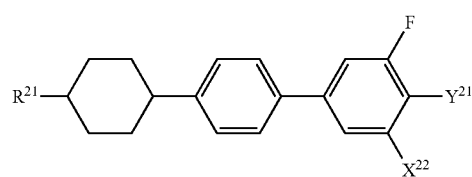
(LC2-2)

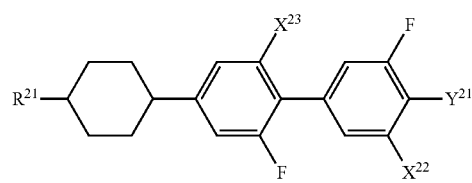
(LC2-3)

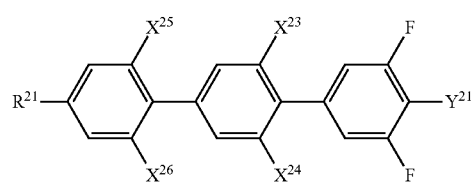
(LC2-4)

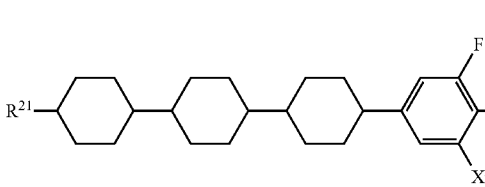
(LC2-5)

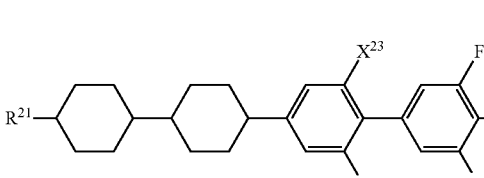
(LC2-6)

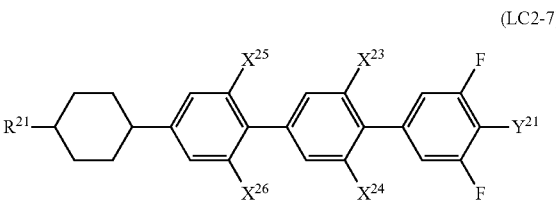
(LC2-7)

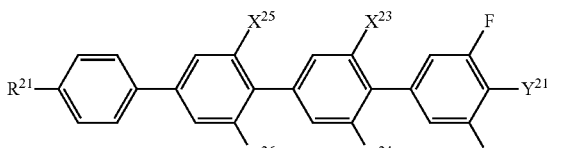
(LC2-8)

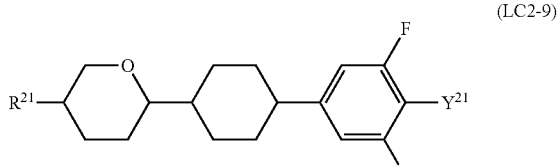
(LC2-9)

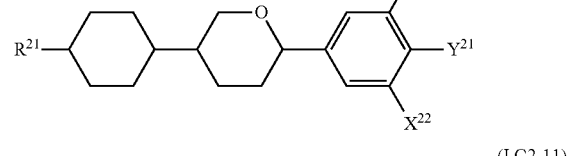
(LC2-10)

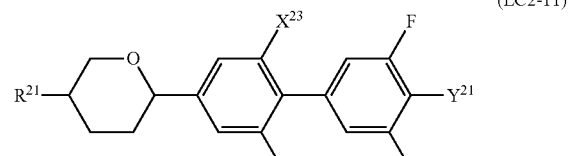
(LC2-11)

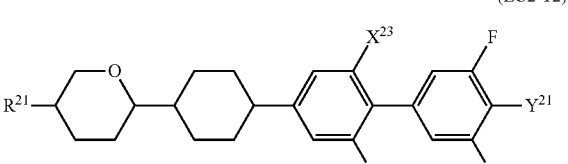
(LC2-12)

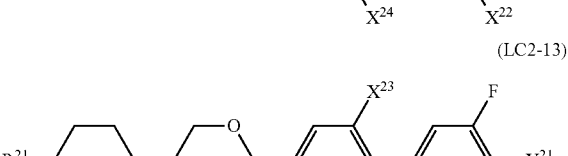
(LC2-13)

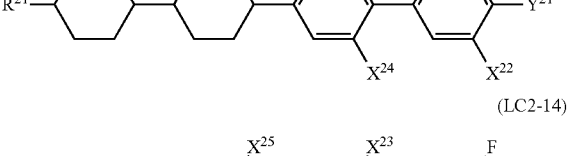
(LC2-14)

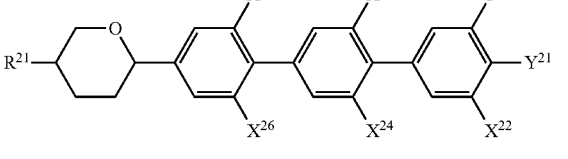

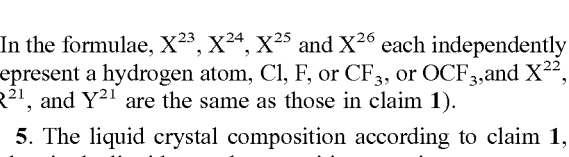

(In the formulae, $X^{23}$, $X^{24}$, $X^{25}$ and $X^{26}$ each independently represent a hydrogen atom, Cl, F, or $CF_3$, or $OCF_3$, and $X^{22}$, $R^{21}$, and $Y^{21}$ are the same as those in claim 1).

5. The liquid crystal composition according to claim 1, wherein the liquid crystal composition contains one or more compounds selected from the group consisting of compounds represented by general formula (LC3-1) to general formula (LC3-32) as the compound represented by general formula (LC3):

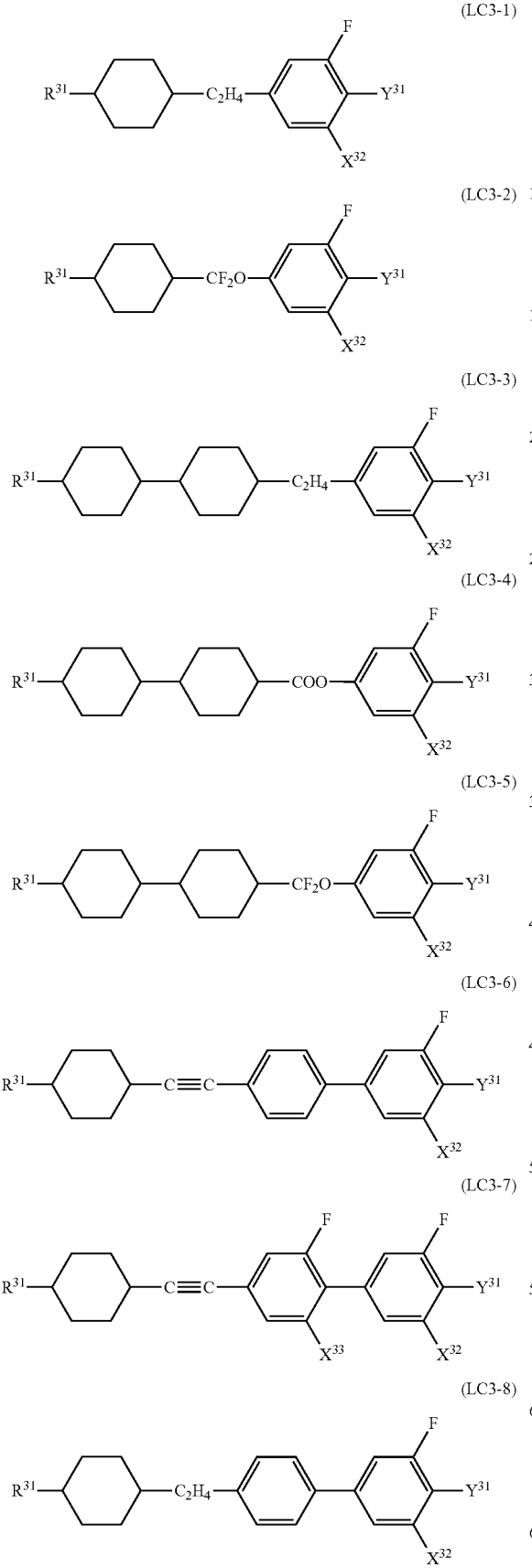
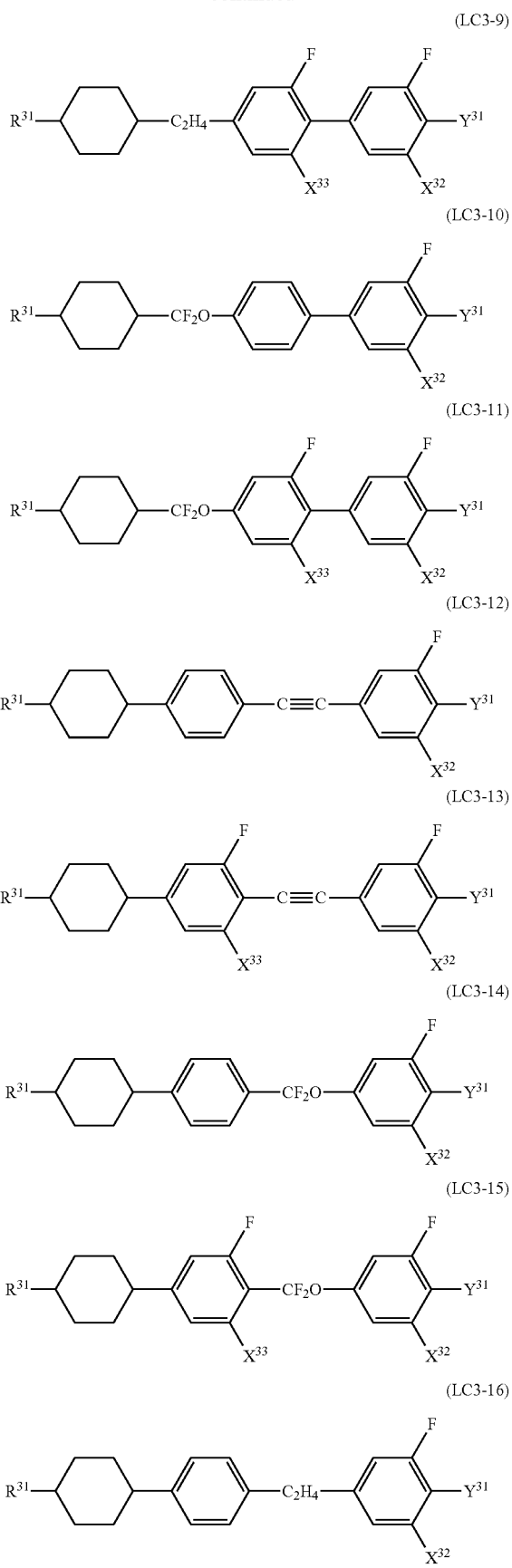

(LC3-17)
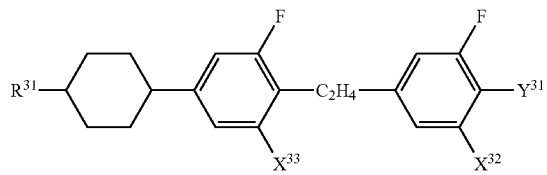

(LC3-18)
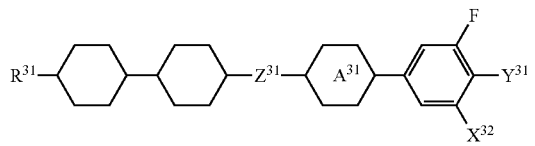

(LC3-19)
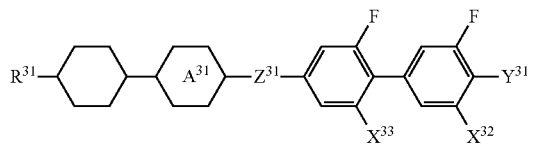

(LC3-20)
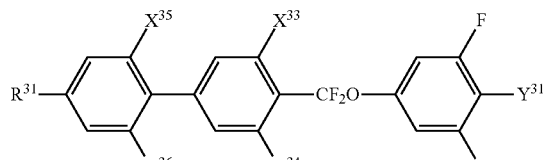

(LC3-21)
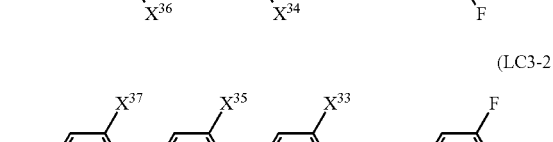

(LC3-22)
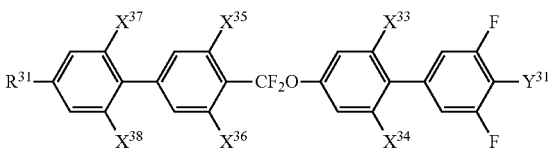

(LC3-23)
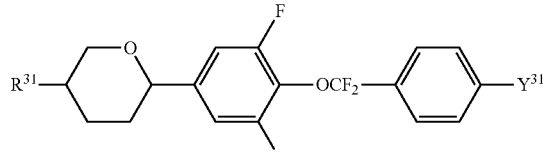

(LC3-24)
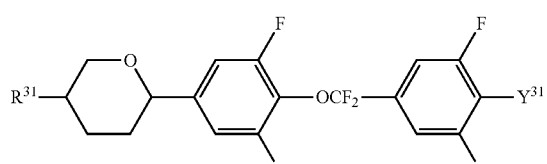

(LC3-25)
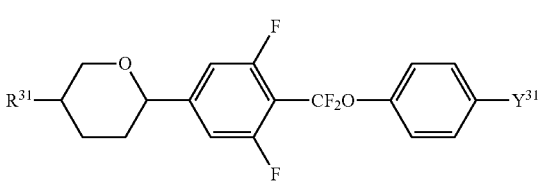

(LC3-26)
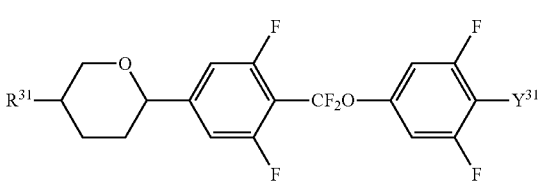

(LC3-27)
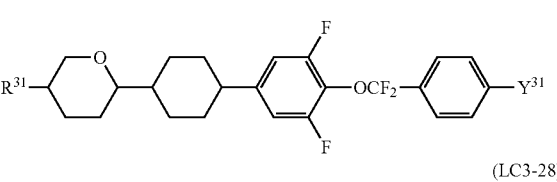

(LC3-28)
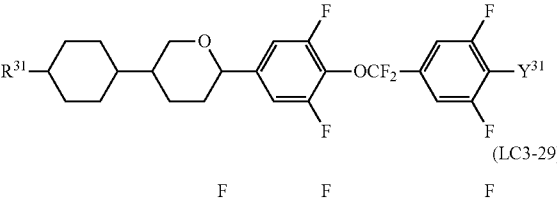

(LC3-29)
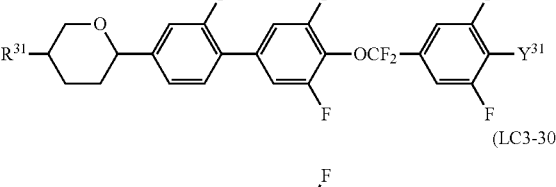

(LC3-30)
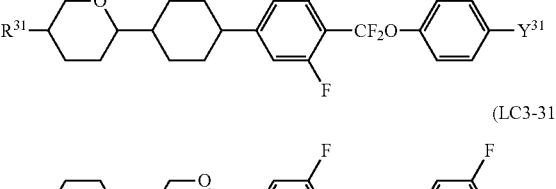

(LC3-31)
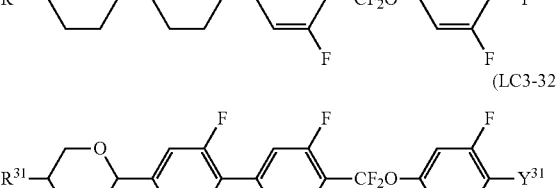

(LC3-32)
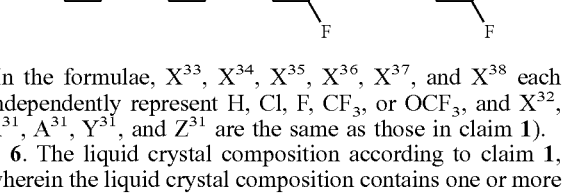

(In the formulae, $X^{33}$, $X^{34}$, $X^{35}$, $X^{36}$, $X^{37}$, and $X^{38}$ each independently represent H, Cl, F, $CF_3$, or $OCF_3$, and $X^{32}$, $R^{31}$, $A^{31}$, $Y^{31}$, and $Z^{31}$ are the same as those in claim 1).

6. The liquid crystal composition according to claim 1, wherein the liquid crystal composition contains one or more compounds selected from the group consisting of compounds represented by general formula (LC4-1) to general formula (LC4-23) as the compound represented by general formula (LC4):

(LC4-1) 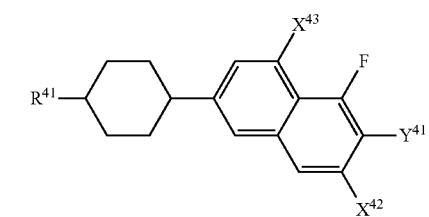
(LC4-2) 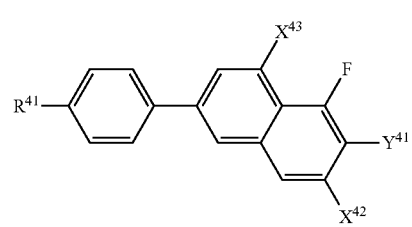
(LC4-3) 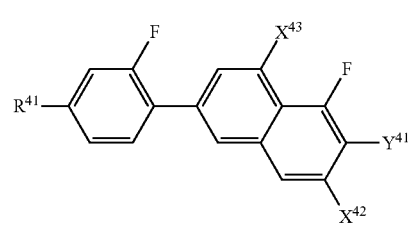
(LC4-4) 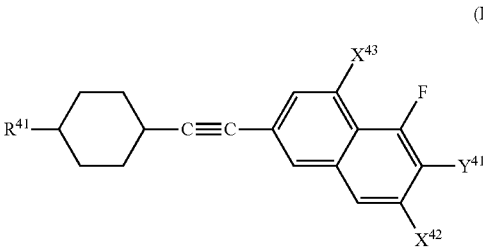
(LC4-5) 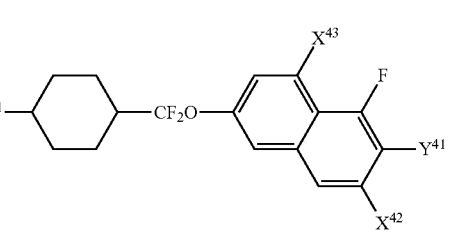
(LC4-6) 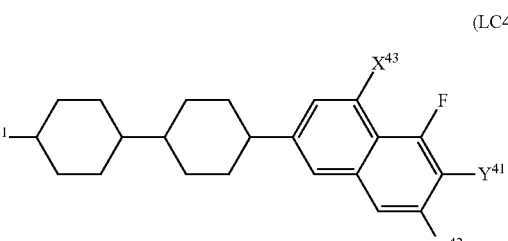
(LC4-7) 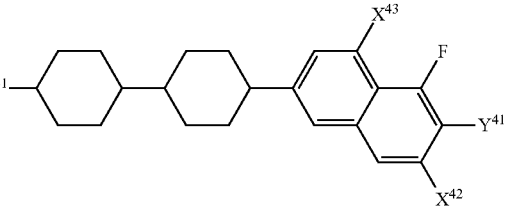
(LC4-8) 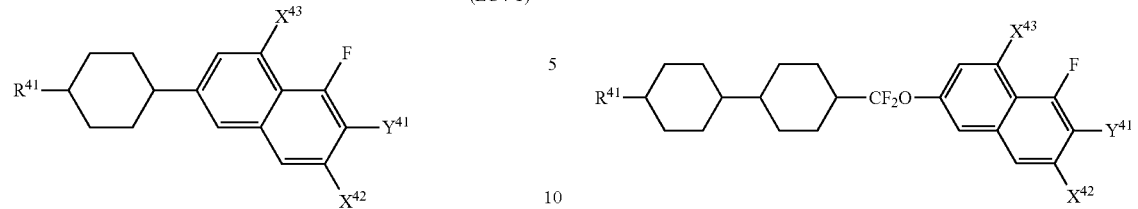
(LC4-9) 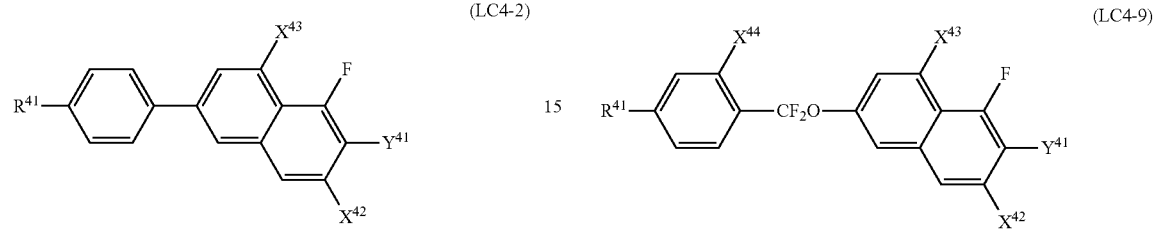
(LC4-10) 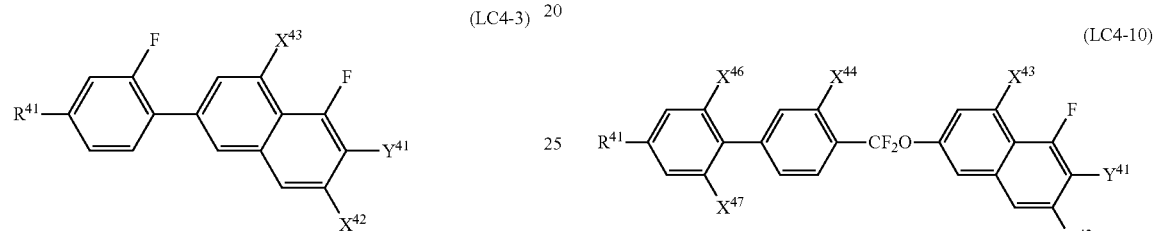
(LC4-11) 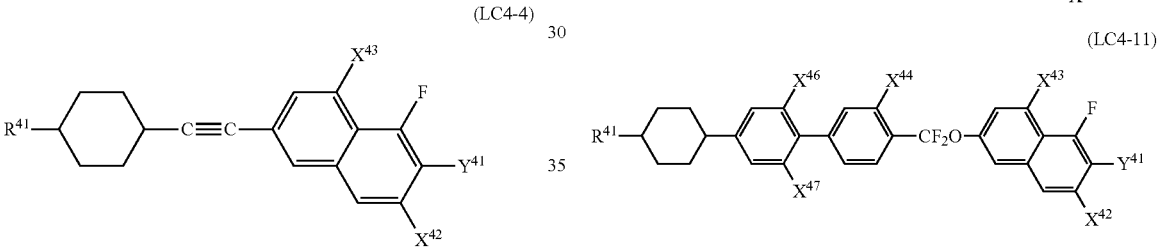
(LC4-12) 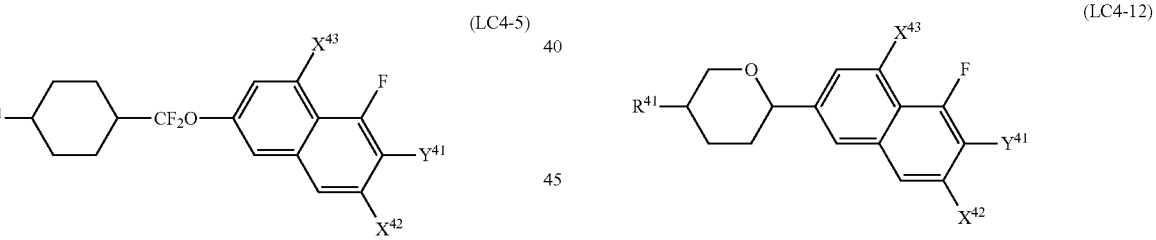
(LC4-13) 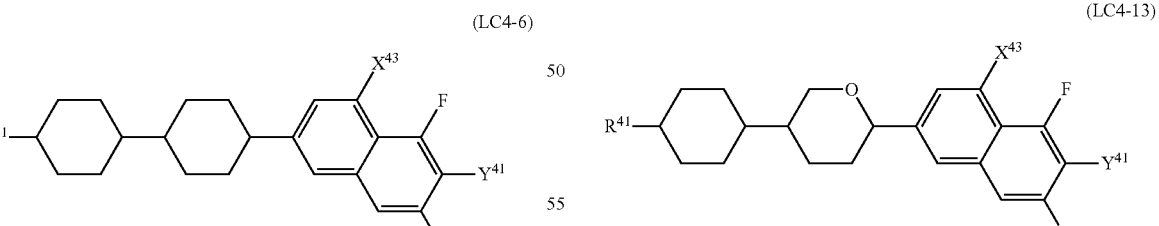
(LC4-14) 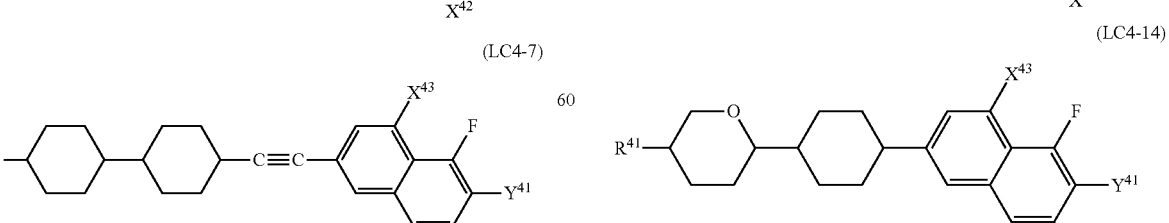

-continued

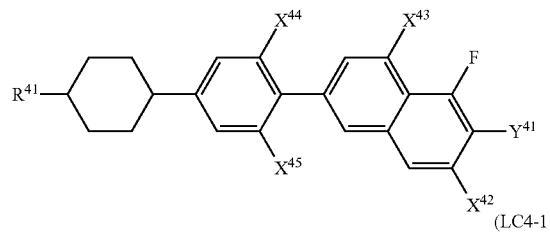
(LC4-15)

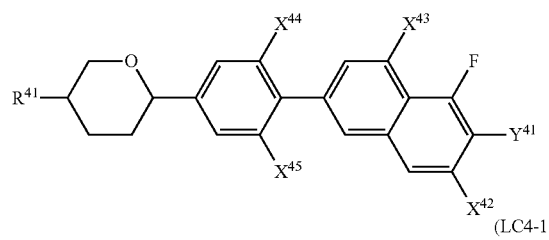
(LC4-16)

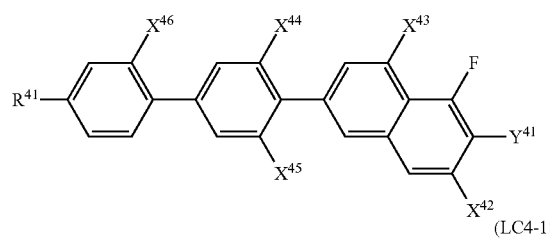
(LC4-17)

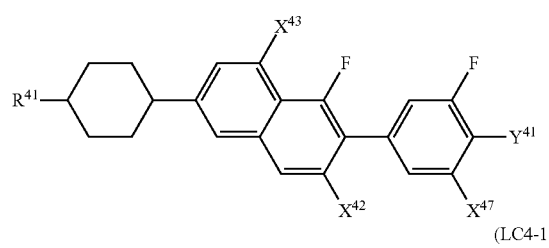
(LC4-18)

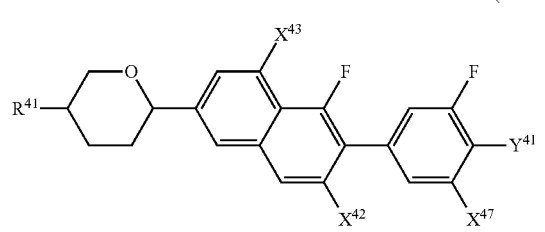
(LC4-19)

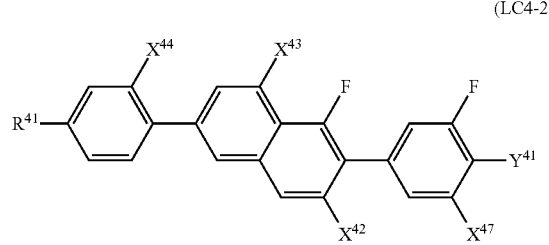
(LC4-20)

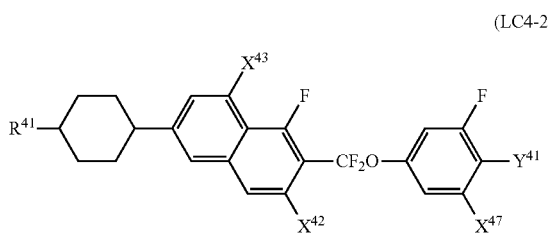
(LC4-21)

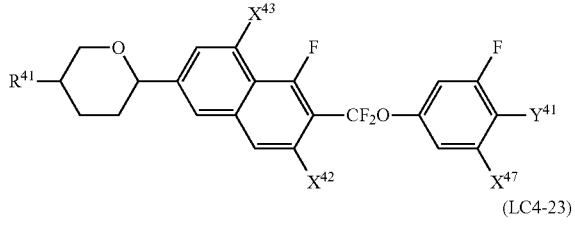
(LC4-22)

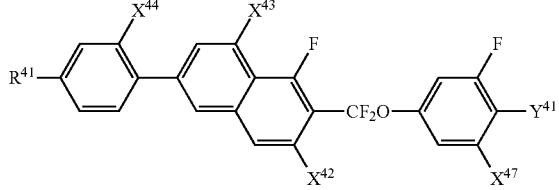
(LC4-23)

(In the formulae, $X^{44}$, $X^{45}$, $X^{46}$, and $X^{47}$ each independently represent H, Cl, F, $CF_3$, or $OCF_3$, and $X^{42}$, $X^{43}$, $R^{41}$, and $Y^{41}$ are the same as those in claim 1).

7. The liquid crystal composition according to claim 1, wherein the liquid crystal composition contains one or more compounds selected from the group consisting of compounds represented by general formula (LC5-1) to general formula (LC5-26) as the compound represented by general formula (LC5):

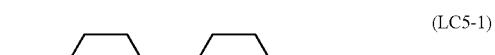
(LC5-1)

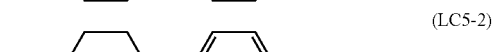
(LC5-2)

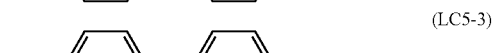
(LC5-3)

(LC5-4)

(LC5-5)

(LC5-6)

(LC5-7)

(LC5-8)

-continued (LC5-9)
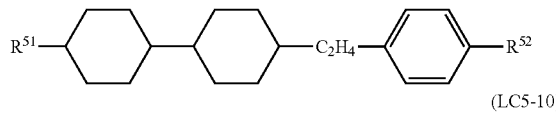

(LC5-10)
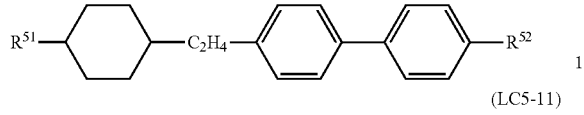

(LC5-11)
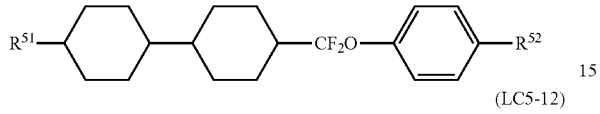

(LC5-12)
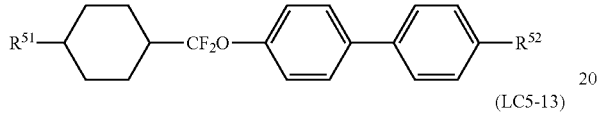

(LC5-13)
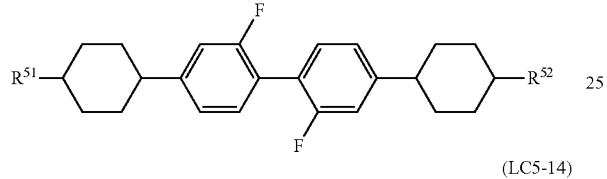

(LC5-14)
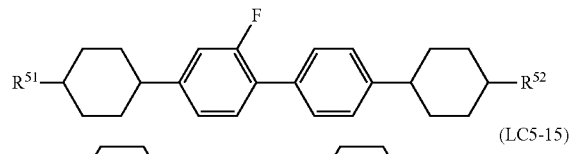

(LC5-15)
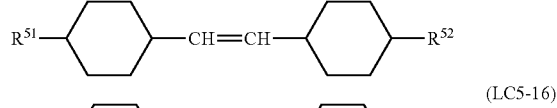

(LC5-16)
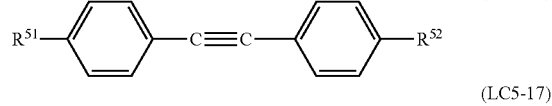

(LC5-17)
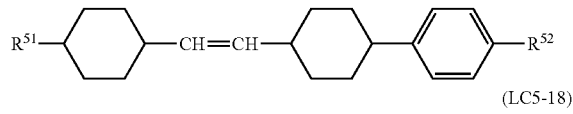

(LC5-18)
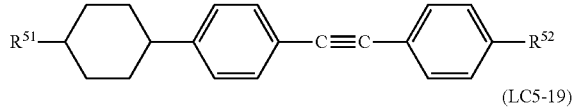

(LC5-19)
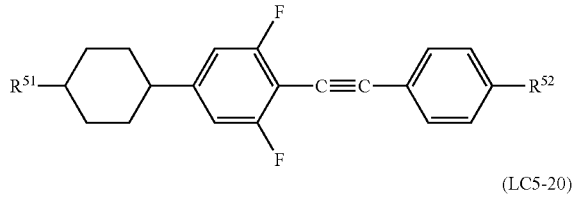

(LC5-20)
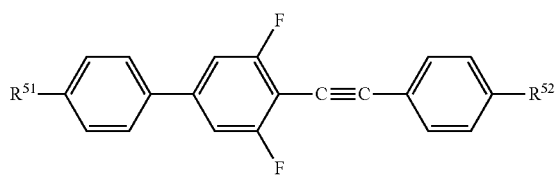

-continued (LC5-21)
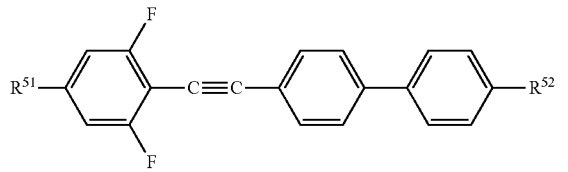

(LC5-22)
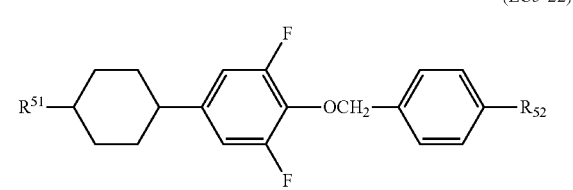

(LC5-23)
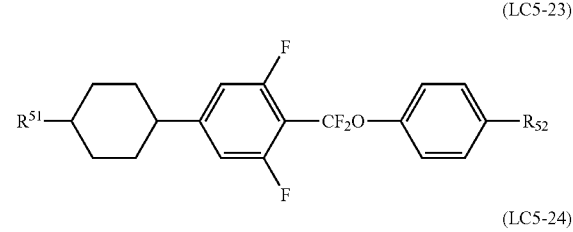

(LC5-24)
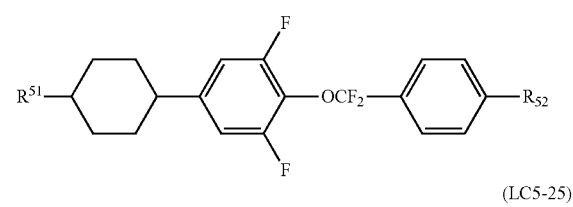

(LC5-25)
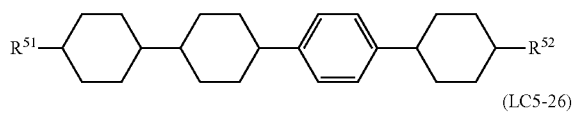

(LC5-26)
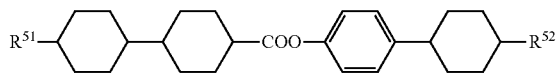

In the formulae, $R^{51}$ and $R^{52}$ are the same as those in claim 1.

8. The liquid crystal composition according to claim 1, wherein the liquid crystal composition contains one or more compounds in which $R^{02}$ to $R^{41}$, $R^{51}$, and/or $R^{52}$ present in general formula (LC1) to general formula (LC5) represents an alkenyl group having 2 to 5 carbon atoms.

9. The liquid crystal composition according to claim 1, wherein the liquid crystal composition contains one or more compounds in which at least one of $A^{11}$ to $A^{42}$ and/or $A^{51}$ to $A^{53}$ present in general formula (LC0) to general formula (LC5) represents a tetrahydropyran-2,5-diyl group.

10. The liquid crystal composition according to claim 1, wherein the liquid crystal composition contains one or more compounds in which at least one of $Z^{01}$, $Z^{02}$, $Z^{31}$ to $Z^{42}$, $Z^{51}$, and $Z^{52}$, that are present in general formula (LC0) and general formula (LC3) to general formula (LC5) represents —$CF_2O$— or —$OCF_2$—.

11. The liquid crystal composition according to claim 1, wherein the liquid crystal composition contains 30 to 70% by mass of the compounds represented by general formula (LC5) and has a bulk viscosity η of 20 mPa·s or less at 20° C.

12. The liquid crystal composition according to claim 1, wherein the liquid crystal composition contains one or more optically active compounds.

13. The liquid crystal composition according to claim 1, wherein the liquid crystal composition contains one or more polymerizable compounds.

14. The liquid crystal composition according to claim 1, wherein the liquid crystal composition contains one or more antioxidants.

15. The liquid crystal composition according to claim 1, wherein the liquid crystal composition contains one or more UV absorbers.

16. A liquid crystal display device using the liquid crystal composition on according to claim 1.

17. An active matrix driving liquid crystal display device using the liquid crystal composition according to claim 1.

18. A TN-mode, OCB-mode, ECB-mode, IPS-mode, or VA-IPS-mode liquid crystal display device using the liquid crystal composition according to claim 1.

19. A polymer-stabilized TN-mode, OCB-mode, ECB-mode, IPS-mode, or VA-IPS-mode liquid crystal display device that uses the liquid crystal composition according to claim 13 and is produced by polymerizing the polymerizable compounds in the liquid crystal composition in the absence or presence of applied voltage.

20. The liquid crystal display device according to claim 16, wherein an alignment layer that has a surface that comes into contact with liquid crystal molecules and causes the liquid crystal molecules to align horizontally, tilt, or align vertically includes an alignment film containing at least one compound selected from polyimide (PI), polyamide, chalcone, cinnamate, and cinnamoyl.

21. The liquid crystal display device according to claim 20, wherein the alignment layer according to claim 20 further includes a polymerizable liquid crystal compound or a polymerizable non-liquid crystal compound.

22. The liquid crystal display device according to claim 20, wherein an alignment film prepared by an optical alignment technology is formed as the alignment layer at the surface that comes into contact with the liquid crystal composition.

* * * * *